United States Patent [19]
Yamasaki et al.

[11] Patent Number: 5,580,458
[45] Date of Patent: Dec. 3, 1996

[54] METHOD FOR WASTE WATER TREATMENT USING CALCIUM CARBONATE MINERAL AND MICROORGANISMS IN COMBINATION

[75] Inventors: Kazuyuki Yamasaki, Hiroshima; Yoshihiro Hamaguchi, Kurashiki; Shunji Hosoda, Fukuyama; Kazuyuki Sakata, Fukuyama; Takashi Imai, Fukuyama; Shigetoshi Okatani, Fukuyama; Satoshi Nishio, Fukuyama; Tuyoshi Takahashi, Fukuyama; Kenji Matuura, Fukuyama; Noriyuki Tanaka, Fukuyama; Teruaki Nagayasu, Fukuyama; Hiroshi Makino, Fukuyama, all of Japan

[73] Assignee: Sharp Kabushiki Kaisha, Osaka, Japan

[21] Appl. No.: 452,400

[22] Filed: May 26, 1995

Related U.S. Application Data

[62] Division of Ser. No. 97,857, Jul. 29, 1993, Pat. No. 5,480,537.

[30] Foreign Application Priority Data

| | | | |
|---|---|---|---|
| Jul. 31, 1992 | [JP] | Japan | 4-205056 |
| Nov. 24, 1992 | [JP] | Japan | 4-313393 |
| Mar. 1, 1993 | [JP] | Japan | 5-39830 |
| Apr. 14, 1993 | [JP] | Japan | 5-86996 |
| Jun. 21, 1993 | [JP] | Japan | 5-149349 |

[51] Int. Cl.$^6$ ................................. C02F 3/34
[52] U.S. Cl. .................. 210/609; 210/611; 210/614; 210/617; 210/618; 210/624; 210/631; 210/715; 210/721; 210/724; 210/726; 210/738; 210/760; 210/915
[58] Field of Search .................... 210/610, 611, 210/614, 615, 617, 623, 631, 715, 721, 726, 724, 738, 752, 758, 760, 915, 609, 618, 624

[56] References Cited

U.S. PATENT DOCUMENTS

| | | | |
|---|---|---|---|
| 1,364,387 | 1/1921 | Landreth | 210/721 |
| 2,422,258 | 6/1947 | Prager | 210/715 |
| 2,458,163 | 1/1949 | Hays | 210/615 |
| 3,402,125 | 9/1968 | Tanaka | 210/151 |

(List continued on next page.)

FOREIGN PATENT DOCUMENTS

| | | |
|---|---|---|
| 49-64255 | 6/1974 | Japan . |
| 51-96159 | 8/1975 | Japan . |
| 51-32060 | 3/1976 | Japan . |
| 51-142864 | 12/1976 | Japan . |
| 56-10120 | 3/1981 | Japan . |
| 2-174994 | 6/1990 | Japan . |

*Primary Examiner*—Peter A. Hruskoci
*Attorney, Agent, or Firm*—Nixon & Vanderhye

[57] ABSTRACT

An apparatus for waste water treatment, wherein fluorine contained in waste water is treated into a fluoride through a chemical reaction and sludge containing the fluoride is thickened and dehydrated into a sludge cake, has first and second tanks each packed with calcium carbonate mineral. In the first tank, waster water containing fluorine is agitated by air discharged from an air diffuser and caused to react with the calcium carbonate mineral. Through this reaction of the waste water with the calcium carbonate mineral and action of microorganisms on the surface of the calcium carbonate mineral, a pH value and a fluorine concentration of the waste water is adjusted till the pH value and the fluorine concentration fall within their respective predetermined ranges. In the second tank, an aluminum agent is added to the waste water coming from the first tank while the waste water being agitated so that the pH value and the fluorine concentration of the waste water are further adjusted through a chemical reaction of the fluorine with the calcium carbonate mineral and aluminum agent and action of microorganisms propagating on the surface of the mineral so as to fall within their respective target ranges.

15 Claims, 11 Drawing Sheets

U.S. PATENT DOCUMENTS

| | | | |
|---|---|---|---|
| 3,623,976 | 11/1971 | Cessna | 210/615 |
| 3,728,253 | 4/1973 | Kaufman | 210/715 |
| 3,773,660 | 11/1973 | Hopwood | 210/195.3 |
| 4,008,159 | 2/1977 | Besik | 210/151 |
| 4,159,246 | 6/1979 | Matsumoto | 210/915 |
| 4,388,195 | 6/1983 | von Hagel et al. | 210/709 |
| 4,657,680 | 4/1987 | Zibrida | 210/915 |
| 4,717,519 | 1/1988 | Sagami | 210/615 |
| 4,724,084 | 2/1988 | Pahmeier et al. | 210/709 |
| 5,043,072 | 8/1991 | Hitotsuyanagi et al. | 210/915 |
| 5,156,746 | 10/1992 | Maree et al. | 210/724 |
| 5,403,495 | 4/1995 | Kust et al. | 210/915 |
| 5,423,988 | 6/1995 | Yamasaki et al. | 210/611 |

METHOD FOR WASTE WATER TREATMENT USING CALCIUM CARBONATE MINERAL AND MICROORGANISMS IN COMBINATION

This is a RULE 60 Divisional of application Ser. No. 08/097,857, filed 29 Jul. 1993 now U.S. Pat. No. 5,480,537.

BACKGROUND OF THE INVENTION

1. Field of the Invention

The present invention relates to a method and apparatus for waste water treatment which can effectively treat by biochemical reaction fluorine, organic substances, such as surfactants, and hydrogen peroxide ($H_2O_2$) that are present in waste water.

2. Description of the Prior Art

Recently, nonuse of fluorocarbon has been strongly called for. In view of this need of the times, industrial establishments, such as semiconductor and liquid crystal factories in particular, are beginning to use different kinds of surfactants, alcohol-based organic solvents, fluorine-based solvents, and the like as substitutes for cleaning-purpose fluorocarbon. Also, from the standpoint of process refinement, such surfactants and organic solvents are actually used.

Especially, cleaning by a combination of ultrapure water and a surfactant is expected to be a vital substitute cleaning method oriented toward total nonuse of fluorocarbon, when considered in terms of detergency and possible effects on parts. As such, operations in semiconductor and liquid crystal factories have a tendency to increase effluent containing fluorine and surfactants used in the process of wafer fabrication.

Generally, referring first to fluorine, in the case of semiconductor factories, fluorine-containing effluent often has a fluorine concentration on the order of 30 to 300 ppm. An influent containing fluorine of such concentration is subjected to waste water treatment in such a way that a chemical, such as slaked lime, polyaluminum chloride, or polymer coagulant, is added to the waste water to form flocs of a hardly soluble calcium fluoride or aluminum fluoride. The flocs of calcium fluoride or aluminum fluoride are then coagulated by a coagulant into larger flocs, and the flocs thus formed are then precipitated for separation.

Referring next to surfactants, it is to be noted that microfabrication techniques will further progress in up-to-date semiconductor and liquid crystal factories, and that there will be a difficulty in cleaning minute parts with ultrapure water because of its surface tension. For this reason, in a cleaning method which is now widely in practice such that a surfactant and/or an organic substance, such as alcohol, is added to ultrapure water, whereby the surface tension of water is reduced to enable cleaning microfine portions. However, such materials as Surfactants and the like can hardly be microbially degraded because of their molecular and structural formulas, foaming characteristics, and germicidal effect. Nevertheless, it is anticipated that microfabrication will progress much further in semiconductor and liquid crystal factories and, therefore, surfactants and the like contained in fluorine-containing effluent will tend to increase in proportion to the progress of such microfabrication. Therefore, in conjunction with the treatment of above said fluorine content, it is also necessary to treat waste water containing organic substances, mainly surfactants, in a reasonable and economical manner.

Also it is anticipated that fluorine will continue to be contained in effluent from semiconductor and liquid crystal factories because fluorine-containing ultrapure water has good cleaning effect on wafers. At the same time, some chemicals used in semiconductor and liquid crystal factories will increasingly tend to contain a surfactant in line with the progress of the microfabrication. As a typical example of such chemical may be mentioned a Surfactant-containing buffered hydrofluoric acid.

Hitherto, for treatment of waste water containing fluorine and surfactants discharged from various types of industrial establishments and also from semiconductor and liquid crystal factories, there has been known a method wherein a large amount of slaked lime is added to the waste water relative to the fluorine contained therein to produce a hardly soluble calcium fluoride so that the fluorine is precipitated for chemicophysical removal. After the step of fluorine treatment, organic matter, such as surfactant, is microbiologically (biologically) treated in a tank other than for fluorine treatment while nutrients, such as phosphoric acid and urea, being added to the tank.

In semiconductor and/or liquid crystal factories having no facility for microbial waste water treatment, it has been usual practice to collect organic substances, such as surfactants, as much as possible at the manufacturing process and store the collected organic substances in a tank installed at a separate location, which substances are in turn transferred to an independent firm for treatment.

Conventional apparatuses for treatment of waste water containing fluorine and surfactants include, for example, one illustrated in FIG. 8 or FIG. 9. FIG. 8 shows a two-stage coagulating sedimentation system. FIG. 9 shows a two-stage coagulating sedimentation system including a microbial treatment stage. The FIG. 8 system is identical with the FIG. 9 system except that a biological contact oxidation tank 28 is not included therein.

The conventional arrangement shown in FIG. 8 will be explained. In the waste water treating apparatus shown, waste water containing fluorine and surfactants is initially caused to flow into a raw waste water tank 14. In the raw waste water tank 14, the fluorine-containing waste water is subjected to some degree of adjustment in both quantity and quality. Thereafter, the waste water is transferred by a waste water tank pump 9 into a first reaction tank 15. In the first reaction tank 15, the fluorine-containing water is loaded with slaked lime and agitated by an agitator 12 for reaction so that fluorine dissolved in the waste water is caused to react with the slaked lime into calcium fluoride. Where the time for reaction of fluorine with the calcium in the slaked lime is relatively short, an appreciable amount of slaked lime is added. Where the pH of the fluorine-containing waste water is considerably low, an adequate amount of slaked lime is added for neutralization.

Then, the waste water is transferred to a second reaction tank 16 in which an aluminum agent is added to the waste water for reaction with unreacted fluorine to produce aluminum fluoride. Fine flocs of calcium fluoride and aluminum fluoride are wrapped with aluminum hydroxide produced by aluminum agent additions.

Nextly, in a first coagulation tank 17, a polymer coagulant is added to the waste water for reaction so that fine flocs of calcium fluoride produced by the reaction in the first reaction tank 15 and fine flocs of aluminum fluoride produced by the reaction in the second reaction tank 16 are grown into larger flocs. Then, the waste water is subjected to solid-liquid separation in a first settling tank 18. A larger part of the slurry including flocs subjected to solid-liquid separation is a hydroxide resulting from excess slaked lime. Although the slurry contains reaction products of calcium fluoride and aluminum fluoride, such reaction products are small in quantity and a larger part of them is a sludge attributable to unreacted chemicals.

In the foregoing stages, the fluorine concentration of the waste water cannot be reduced to the level of a target water quality or not more than 15 ppm. Therefore, the waste water is transferred sequentially to a third reaction tank 19, a second coagulation tank 20, and a second settling tank 21 to reduce the fluorine concentration to the target level. Possibly, the pH in the second settling tank 21 may not come within the effluent standard because of the use of an acid chemical in the third reaction tank 19 or because of the reaction time in the third reaction tank 19 being so short. Therefore, the waste water from the second settling tank 21 is then passed through a pH adjust tank 22 so that the pH of the waste water falls within the range of the effluent quality standard. Thereafter, the waste water is discharged.

Masses of slurry collected from the first settling tank 18 and second settling tank 21 by a collector 13 are concentrated in a sludge concentration tank 5 and dewatered by a dehydrator 6 into a cake having a prescribed water content.

The other conventional arrangement shown in FIG. 9 further includes a microbial treatment stage between the first and second coagulating sedimentation stages. The waste water is introduced from the first settling tank 18 into a contact oxidation tank 28 in which fillers 29 are packed, and surfactants present in the waste water are treated by aerobic microorganisms present in the tank 28. The fillers 29 are corrugated filter mediums made of vinyl chloride or plastics.

However, this contact oxidation tank 28 has involved a problem that even when nutriments or the like which provide good culture conditions for microorganisms are added to the tank, surfactants cannot easily be microbially degraded because of the molecular and structural formulas, germicidal effect, and foamability of the surfactants per se. As such, the trouble is that the treated water remains foamable, and therefore, it has been necessary to add an antifoaming agent or the like anew in order to eliminate such foamability of treated water.

In semiconductor factories, the fluorine concentration of fluorine-containing waste water is always subject to wide variations within a range of 30 to 300 ppm. In actuality, therefore, the quantity of slaked lime required against fluorine in a fluorine/slaked lime reaction is more than three times a stoichiometric quantity for such reaction.

Generally, in semiconductor factories, the pH of fluorine-containing waste water is low and often within the range of about 2 to 3, because the waste water comes from the stage of wafer fabrication in which acid is used.

Therefore, waste water produced in such factories contains fluorine, is rather low in pH value, and is likely to vary in quality. This requires use of slaked lime and the like in large quantities for fluorine treatment and neutralization, which means that large quantities of wastes are finally discharged in the form of cake and otherwise. This fact poses not only the problem of disposal cost, but also great concern over the possibility of securing sites for future waste disposal. That is, a large quantity of cake is generated as a result of sludge being dewatered by a dehydrator 6, and large quantities of such cake, as industrial wastes, are disposed of by landfilling. In other words, semiconductor and liquid crystal factories generate large quantities of waste water which contain fluorine and organic substances, such as surfactants, and this necessitates various considerations including the provision of facilities for treatment of such waste water, keeping the quality of treated waste water up to the effluent standard, and measures for disposal of the increasing resulting wastes. Indeed, industrial wastes generated in such factories have continued to steadily increase. Thus, urgent necessity exists for proper measures against ever growing problems of wastes, including the problem of landfill site availability.

The above noted problems will be further discussed in detail. The conventional method of treating fluorine by addition of slaked lime or the like has a disadvantage that since the pH of fluorine-containing waste water is generally low and since the fluorine concentration of fluorine-containing waste water is subject to wide variation, it is impracticable to properly control the quantity of slaked lime required for neutralization and reaction control. This virtually leads to excessive use of slaked lime. Generally, in semiconductor factories, slaked lime of more than three times as much as a stoichiometric quantity has been used as earlier noted. Addition of more than three times as much slaked lime as the theoretical requirement naturally results in an increase in the proportion of unreacted calcium, which in turn leads to increased generation of hydroxide or the like sludge. After dewatered by a dehydrator, such as filter press, such sludge still has a water content of the order of 65%, which means a large volume of cake. Another reason why actual slaked lime requirement is more than three times the theoretical requirement is that the time for reaction of fluorine-containing waste water with slaked lime added is generally set at not more than 30 minutes, which necessitates excessive loading of slaked lime in order to achieve a sufficient degree of fluorine removal; otherwise, a target value at the first stage of coagulating sedimentation (generally 20 to 30 ppm) cannot be achieved. Conversely, if sufficient time is taken for reaction, it is necessary that the volume of the reaction tank be made more than three times as large as the existing one, which means a size greater than the agitator. This is unreasonable and uneconomical judging from site availability and construction cost.

Treatment of surfactants involves a technical problem arising especially from the fact that surfactants have a germicidal effect upon microorganisms, which makes it difficult to microbially treat the surfactants.

Administrative regulation on the concentration of fluorine in treated waste water is becoming increasingly severe year after year, and currently industrial establishments have their regulation values for fluorine established in consideration of the current administrative standards, which values, in many cases, are of a single digit on the order of several ppm. However, in order to maintain the fluorine concentration in treated waste water at a single digit level, insofar as existing facilities are employed, it is impracticable to achieve a target fluorine concentration unless more than ten times as much aluminum agent as the fluorine concentration is added. With a water treating apparatus having no contact oxidation tank 28 as shown in FIG. 8, waste water containing organic substances, such as surfactants, cannot be microbially treated. This involves the problem of effluent quality deterioration, particularly in COD (Chemical Oxygen Demand).

Today, reasonable and economical treatment of waste water, and, weight reduction of wastes are strongly called for as stringent public needs. This is of vital importance from the standpoint of global environment protection as well. In particular, positive maintenance to a reasonable quality level of treated waste water from semiconductor and liquid crystal factories, as well as weight reduction of wastes, is an urgent task required to be solved.

Hitherto, fluorine-containing waste water and hydrogen peroxide-containing waste water have been separately treated for discharge. The reason for this is that presence of hydrogen peroxide in fluorine-containing waste water adversely affects the process of coagulating sedimentation, and that hydrogen peroxide per se acts as a COD source, thus increasing the COD value of the effluent.

Hydrogen peroxide-containing waste water has been treated by adding a hydrogen peroxide decomposing chemical (e.g., KURIBARTER, a trade name) thereto. Waste water containing hydrogen peroxide in which the concentration of hydrogen peroxide is not more than 1000 ppm is first introduced into a hydrogen peroxide-containing waste water tank wherein the waste water is subjected to some adjustment in volume and quality, and is then transferred by a pump into a hydrogen peroxide decomposition column which is loaded with activated carbon as a catalyst. FIG. 10 shows such a conventional system, wherein the hydrogen peroxide-containing waste water tank is indicated by numeral 55, the pump is indicated by numeral 59 and the hydrogen peroxide decomposition tower is indicated by numeral 56. In the hydrogen peroxide decomposition tank 56, the hydrogen peroxide-containing waste water is catalytically decomposed into water and oxygen gas, with the activated carbon as a catalyst, and after decomposition, separated components are introduced into a hydrogen peroxide treating tank 57 for further treatment.

However, for purposes of piping arrangement at production stages which discharge fluorine and hydrogen peroxide, it has been extremely difficult to arrange for positive prevention of hydrogen peroxide from inclusion into fluorine-containing waste water, because of many production units involved and constructional complexity of the production equipment itself. As such, the development of a waste water treating apparatus which can treat waste water containing hydrogen peroxide and fluorine in one complete arrangement has been eagerly desired.

In each prior art arrangement shown, the raw waste water tank 14 is a tank operative to perform volume and quality adjustment only with respect to waste water. This tank is volumewise large-sized only by reason of retention time, but has no reaction function relative to fluorine. So, the tank is not meaningful in terms of investment efficiency. Therefore, it has been desired that a raw waste water tank be provided which is effectively designed for waste water treatment to enhance investment efficiency.

In semiconductor and liquid crystal factories, there exist domestic waste water treatment facilities for treating domestic waste water from a dining hall, bathrooms, lavatories, and so on. Such domestic waste water treatment facilities generates highly nutrient domestic excess sludge, but in such factories no particular way is found for effective utilization of such domestic excess sludge. In practice, such excess sludge has been disposed of by an independent firm at the expense of each factory.

SUMMARY OF THE INVENTION

The present invention has been developed with a view to substantially solving the above described disadvantages and has for its essential object to provide a method and apparatus for waste water treatment which can treat waste water containing not only fluorine but organic substances, such as surfactants, into treated waste water of good quality involving less waste and which involve less cost of construction and meet reasonable and economical requirements.

It is another object of the invention to provide means which can treat domestic excess sludge as well.

It is a further object of the invention to provide an apparatus and method for waste water treatment which can treat waste water containing both fluorine and hydrogen peroxide in one simultaneous cycle.

In order to achieve the aforementioned object, the present invention provides an apparatus for treatment of waste water wherein fluorine contained in waste water is converted into a fluoride through a chemical reaction, comprising:

a first tank packed with a calcium carbonate mineral for adjusting a pH value and a fluorine concentration of waste water introduced into the first tank through a chemical reaction of the fluorine with the calcium carbonate mineral so that the pH value and the fluorine concentration fall within their respective predetermined ranges;

a second tank packed with a calcium carbonate mineral, wherein an aluminum agent is added to the waste water coming from the first tank so that the pH value and the fluorine concentration of the waste water are further adjusted through a chemical reaction of the fluorine with the calcium carbonate mineral and aluminum agent so as to fall within their respective target ranges; and means for agitating the waste water in the first and second tanks.

In this waste water treatment apparatus, in the first tank, through ionization of calcium in the course of the calcium carbonate mineral (i.e., limestone bed or calcite) being dissolved, the fluorine in the waste water changes into fine flocs of calcium fluoride, in which process carbon dioxide gas and water are produced. According to the invention, sufficient time is allowed for reaction of fluorine with calcium carbonate mineral in exact accordance with the chemical reaction formula in the first tank. Therefore, no hydroxide is generated. This results in less production of dehydrated cake than in the past.

In the second tank, in addition to the reaction with fluorine with the calcium carbonate mineral as in the first tank, an aluminum agent reacts with fluorine in the waste water to an aluminum fluoride and any excess aluminum agent changes fast into flocs of aluminum hydroxide to which is adsorbed the aluminum fluoride. Thus, the fluorine concentration of the waste water is further reduced.

The waste water is neutralized by the calcium carbonate mineral in the first and second tanks. Neutralization of the waste water is also attributable to airborne microorganisms which are included into the waste water during agitation thereof and propagate on the surface of the calcium carbonate mineral. That is, the calcium carbonate mineral serves as an immobilizing carrier for such microorganisms because the surface of the calcium carbonate mineral facilitates spontaneous generation of microorganisms. The microorganisms eat fluorine in the waste water to accumulate the same in vivo in a concentrated state. Especially where, in the future, such a species of microorganism as is more highly capable of accumulating fluorine in vivo is found, the fluorine treating performance of the apparatus will be much further improved by utilizing such microorganism. It is to be noted here that aluminum hydroxide produced in the second tank is a substance which is produced in a purification plant as well by addition of an aluminum agent, and that its action is chemically relatively gentle toward fish and microorganisms. Therefore, aluminum hydroxide has no or little, if any, effect upon microbial activity.

In the present application, the term "microorganisms" are used in a broad meaning and include bacteria, fungi, protozoa, algae, etc.

As described above, fluorine removal and waste water neutralization are carried out with calcium carbonate mineral and microorganisms and, sufficient time is allowed for reaction, without any excessive use of chemicals. This affords considerable saving in costs of operation including cost of chemicals. There is no generation of hydroxide that has beth a larger source of sludge in the past. Thus, sludge generation is considerably reduced. It is no longer necessary to provide a pH adjustment tank. Further, airborne microorganisms are included into the waste water through agitation thereof and easily propagate on the surface of the calcium carbonate mineral and therefore organic substances such as surfactants as well can be biologically treated by those microorganisms. Further, due to the reduction in sludge generation, some size reduction can be achieved with such units as a coagulation tank, settling tank, etc. Furthermore, because the first and second tanks are open tanks, maintenance of the tanks is easy.

In an embodiment of the present invention, the waste water treatment apparatus further has a third tank connected between the second tank and the coagulation tank. The third tank has a sludge carrying means for carrying sludge thereupon so as to immobilize it. At least part of a sludge separated from the waste water in the settling tank is returned to the third tank and attached to the sludge carrying means.

According to this arrangement, microorganisms present in the third tank can be well cultivated by the returned sludge and eat the sludge, so that a higher level of organic matter treatment can be achieved as compared with the prior art.

In another embodiment, bacteria of *Bacillus subtilis* Kubota (referred to as BSK bacteria) are supplied to the third tank. More specifically, a sludge containing the bacteria and a sludge from the settling tank are mixed and the mixture is transferred to the third tank. This arrangement provides for a still higher level of organic matter treatment by virtue of the BSK bacteria, which are cultured with domestic excess sludge as a nutrient.

The BSK bacteria are a kind of *Bacillus subtilis* existing in nature and their colonies have some stickiness. In the invention, such stickiness is well utilized to increase the concentration of sludge in the third tank, thereby to provide improved waste-water treatment capability. BSK bacteria are commercially available.

Aluminum hydroxide flocs immobilized in the third tank tend to adsorb fine particles of calcium fluoride and aluminum fluoride in waste water.

For purposes of immobilizing a fresh activated sludge composed principally of BSK bacteria and returned sludge containing aluminum and/or calcium, vinylidene chloride is preferably selected as an immobilizing carrier material. However, such a carrier material is not limited to vinylidene chloride. Basically, any material may be selected as an immobilizing carrier material without limitation, insofar as the material can readily immobilize sludge containing microorganisms and aluminum and/or calcium. It is only important that the immobilizing carrier be capable of immobilizing both biological sludge and inorganic sludge to a high concentration level.

Generally, sludges of the above noted type are likely to attach to a fiber-form immobilizing carrier and be immobilized. Sludge containing BSK bacteria is more likely to attach to an immobilizing carrier made of vinylidene chloride or the like as compared with conventional activated sludge, because of the fact that as already noted, a colony of the BSK bacteria has some stickiness. The higher the concentration of sludge in the third tank, the greater is the effect of treatment of fluorine and organic substances such as surfactants in waste water. Naturally, the higher the concentration of sludge in the third tank, the higher is the microbial and contact adsorption reaction efficiency. Once the concentration of sludge in the third tank reaches its extremity, masses of sludge will then become spontaneously separated from the immobilizing carrier made of vinylidene chloride or the like and begin to flocculate. After coagulation, solid-liquid separation is effected in the settling tank.

Generally, it is known that a settling tank for inorganic sludge has greater stability in treated waste water quality than a settling tank for biological sludge. According to the invention, sludge containing BSK bacteria and sludge containing aluminum and calcium are generated and, therefore, it is intended that advantages of both inorganic sludge and biological sludge are to be utilized. The invention advantageously utilizes, in combination, the advantages of both biological sludge and inorganic sludge, namely, the treatment effect of the former sludge upon organic substances including surfactants, and the stabilization effect of latter sludge upon treated waste water in the settling tank. Sludge containing calcium and/or aluminum is almost unlikely to have an adverse effect upon microorganisms. Rather, it is said that calcium has a favorable effect on the propagation and stabilization of microorganisms.

The domestic excess sludge can be also supplied to the third tank. In this case, in the third tank, the domestic excess sludge is treated by the BSK bacteria, and the BSK bacteria, nourished through this process, become further multiplied so that the sludge from the settling tank can be treated more effectively. That is, domestic excess sludge which may require a large cost of treatment can be advantageously utilized as nutrients for microbial growth and propagation. Digestive action of excess sludge serves to reduce generation of new excess sludge. Weight reduction of wastes is thus possible. In addition, costs for disposal of domestic excess sludge are dispersed with.

As described above, according to the present invention, it is possible to carry out, simultaneously with fluorine removal, biological treatment of organic matter, such as surfactants, by utilizing microorganisms and BSK bacteria propagated on particles of calcium carbonate mineral, without need for any biological treatment facility which may enable addition of nutrients for microbial propagation.

Preferably, in the first and second tanks, the waste water is agitated by an aeration device including an air diffuser. And an ozone generator is connected with the aeration device for the first tank and air containing ozone is supplied to the first tank. The second tank is supplied with air containing no ozone. In this case, organic matter present in waste water is oxidatively destructed by ozone, and ozone also acts as a catalyst to accelerate a reaction between the fluorine and the calcium carbonate mineral. Ozone further acts to oxidatively decolor the waste water when the waste water is colored as a result of the inclusion of resists or the like therein.

As a result, use of aerated agitation by ozone-containing air permits stable and efficient treatment of both fluorine and organic matter in same tank. The apparatus of the invention, taken as a whole, is more simple as compared with the prior art apparatus, and this provides for further reduction in the number of operating tanks. Ancillary parts are less required than in the prior art. This means less initial cost.

Preferably, the first tank and second tank each have a portion in which no calcium carbonate mineral is present, and the agitation force of the agitating means for the first and second tanks is adjustable. In an embodiment, the agitating means are constituted of an aeration device including an air diffuser and a blower. The agitation force, more specifically, output from the blower may be controlled by a control means connected with a pH meter and/or a fluorine meter. This permits the waste water treating capability of the apparatus to be controlled to the optimum conditions according to the characteristics of the waste water.

For example, when a fluorine concentration is high, microorganisms are made to detach from the surface of the calcium carbonate mineral by strong aeration so that the detached microorganisms effectively treat fluorine due to the flocculating behavior of such microbial flocs.

In an embodiment, there is provided a network pipe for housing the calcium carbonate mineral, the network pipe having a lower portion which serves as a non-loaded air reservoir such that the calcium carbonate mineral is efficiently fed with air through air supply from the lower portion. This facilitates the propagation of air-borne microorganisms on the calcium carbonate mineral, resulting in good improvement in the efficiency of microbial waste water treatment.

When the aeration device comprising an air diffuser pipe is used, the waste water within each of the first and second tanks which are equipped with the network pipe is agitated by air supplied via the air diffuser pipe, with the result that the interior of the tank is rendered aerobic. Therefore, aerobic micro-organisms are made easier to treat or eat organic substances in the waste water, whereby good efficiency improvement can be achieved in waste water treatment.

The network pipe in the second tank may contain activated carbon in addition to calcium carbonate mineral. In this case, the waste water treatment apparatus further has a function to treat, by decomposition, hydrogen peroxide present in the waste water by virtue of the activated carbon. Thus, fluorine and hydrogen peroxide in the waste water can be simultaneously treated.

According to another aspect of the present invention, an apparatus for treating waste water wherein waste water chemically treated undergoes two stages of sedimentation treatment in first and second settling tanks, comprises:

a raw waste water tank for adjusting raw waste water in quantity and quality to some degree;

a reaction tank for adjusting a pH value and a fluorine concentration of the waste water transferred from the raw waste water tank through a chemical reaction of fluorine contained in the waste water with calcium added to the waste water so that the pH value and the fluorine concentration fall within their respective predetermined ranges;

means for supplying a sludge containing bacteria of *Bacillus subtilis* Kubota;

a first inorganic and biological sludge immobilizing tank which receives the waste water from the first reaction tank and sends the same toward the first settling tank and in turn receives from the first settling tank a sludge containing at least one of calcium and aluminum and to which the sludge containing the bacteria is supplied from said supplying means, said first inorganic and biological sludge immobilizing tank having aeration means and carrying means for carrying the sludge thereupon so as to immobilize it; and a second inorganic and biological sludge immobilizing tank which receives the waste water from the first settling tank, sends the same to the second settling tank, and in turn receives from the second settling tank a sludge containing at least one of aluminum and calcium and to which the sludge containing the bacteria is supplied from said supplying means, said second inorganic and biological sludge immobilizing tank having aeration means and carrying means for carrying the sludge thereupon so as to immobilize it.

According to this arrangement, sludge containing aluminum and/or calcium is returned from the first settling tank to the first inorganic and biological sludge immobilizing tank, and similarly from the second settling tank to the second inorganic and biological sludge immobilizing tank. In addition, BSK bacteria are supplied to the first and second inorganic and biological sludge immobilizing tanks. Therefore, in the first and second inorganic and biological sludge immobilizing tanks, fresh activated sludge composed principally of BSK bacteria and aluminum hydroxide and/or calcium hydroxide is maintained at a high concentration level. According to the invention, therefore, the fluorine and surfactants in the waste water can be simultaneously treated in an efficient manner.

Vinylidene chloride is preferably selected as material of the sludge carrying means in the first and second inorganic and biological sludge immobilizing tanks. However, such a carrier material is not limited to vinylidene chloride, as described above.

The higher the concentration of sludge in the first and second inorganic and biological sludge immobilizing tanks, the greater is the effect of treatment of fluorine and organic substances such as surfactants in waste water. Naturally, the higher the concentration of sludge in the first and second inorganic and biological sludge immobilizing tanks, the higher is the microbial and contact adsorption reaction efficiency. Once the concentration of sludge in each inorganic and biological sludge immobilizing tank reaches its extremity, masses of sludge will then become spontaneously separated from the sludge carrying means made of vinylidene chloride or the like and begin to flocculate. After coagulation, solid-liquid separation is effected in each respective settling tank.

Advantageously, this arrangement can be realized by such a small-scale remodelling that a part of the existing waste water treating apparatus is remodelled into the inorganic and biological sludge immobilizing tank. Therefore, the cost of construction is relatively low as compared with construction of a new apparatus. Further, the apparatus of the invention need not have a large-capacity independent microbial treatment tank (contact aeration tank 28 in FIG. 9), which means lower cost of construction.

Hitherto, in order to treat fluorine present in waste water to a level of several ppm or less, it has been necessary to add an aluminum agent in an amount of more than ten times as much as the fluorine concentration in the prior art third reaction tank 19 shown in FIGS. 8 and 9. Therefore, waste water treatment has involved generation of considerable amounts of wastes. In contrast to this, according to the invention, waste water containing fluorine of a low concentration is passed through the second inorganic and biological sludge immobilizing tank in which aluminum-containing sludge is immobilized by the sludge carrying means in a high concentration, and this provides for improvement in the reactivity between fluorine and aluminum over the prior art arrangement. Therefore, the loading of the aluminum agent can be reduced as compared with that used in the past, which naturally results in decreased generation of wastes. Aluminum fluoride is produced within the second inorganic and biological sludge immobilizing tank, and particles of the aluminum fluoride coagulate and become adsorbed on an aluminum hydroxide sludge within the tank. After this process of adsorption, aluminum hydroxide sludge with aluminum fluoride flocs adsorbed thereon tends to separate spontaneously from the sludge carrying means in the second inorganic and biological sludge immobilizing tank. Sludge masses coagulate in the second coagulation tank, and sedimentation takes place in the second settling tank for sludge separation.

In conjunction with the above described fluorine treatment of fluorine-containing waste water, explanation will be given of the differences between the prior art waste water treating methods and the present invention. Conventionally, it is known to treat fluorine by adding calcium carbonate in place of, for example, slaked lime (see Japanese Patent Publication No. 56-10120). This prior art technique is similar to the invention in that calcium carbonate is used, but it is strictly limited to adding calcium carbonate to a reaction tank in which only a short retention time is allowed for the calcium carbonate. Therefore, the known technique entails a disadvantage that unreacted calcium carbonate is produced and this leads to generation of sludge in large quantities. In contrast to this, according to the present invention, calcium carbonate is not added, but, stated particularly by way of example, a calcium carbonate mineral is packed in the first tank in such a quantity as is sufficient to meet about several months' requirements so that reaction of the calcium carbonate mineral with fluorine is effected by aeration. Therefore, the reaction of the mineral with fluorine is positively carried out in exact accordance with the relevant chemical equation. The results of an experimental run for about six months showed that sludge generation occurred but in an extremely smaller quantity as compared with that observed with the prior art arrangement. In summary, the present invention is basically different from such conventional technique adding calcium carbonate because of the unique first and second tanks acting as reaction adjustment tanks which have a quantity and quality adjusting function and a neutralizing function as a result of the reaction between fluorine in the waste water and calcium. The invention provides exceedingly greater treatment capability for fluorine-containing waste water treatment, when compared with the calcium carbonate addition method.

Also, it has hitherto been known to treat waste water by simply adding an aluminum agent. However, with a method for treatment merely through aluminum agent addition, it is impractical to reduce the fluorine concentration in the waste water unless an excessive amount of aluminum agent is added to the waste water. As such, this prior art method involves a very large amount of chemical consumption, or an aluminum agent in particular (see Japanese Patent Application Laid-Open No. 51-32060). In contrast, according to the present invention, a calcium carbonate mineral (in an embodiment, both a calcium carbonate and activated carbon) is packed in the or each tank so that, by vigorously aerating the calcium carbonate mineral (and activated carbon) or by agitating the interior of the tank, microorganisms are separated from the calcium carbonate mineral (and activated carbon), it being thus possible to flocculate fluorine, the target substance to be treated, through the utilization of the flocculation behavior of microorganisms that are spontaneously generated, so that fluorine can be effectively treated by addition of a small amount of aluminum agent. It is to be noted that where greater propagation of microorganisms is required, domestic excess sludge may be previously added directly to the second tank so that microorganisms arising from the domestic excess sludge are immobilized to the surface of the calcium carbonate mineral (and activated carbon). Or, such domestic excess sludge may be constantly supplied to the second tank. Empirically, when waste water is sufficiently aerated, fluorine treating effect of the aluminum agent can be improved and the amount of aluminum agent addition can be reduced. In essence, the present invention is fundamentally different from the prior art techniques in that microorganisms are utilized in fluorine treatment.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention will now be described in further detail in connection with embodiments shown in the accompanying drawings.

(First Embodiment)

Figure 1:
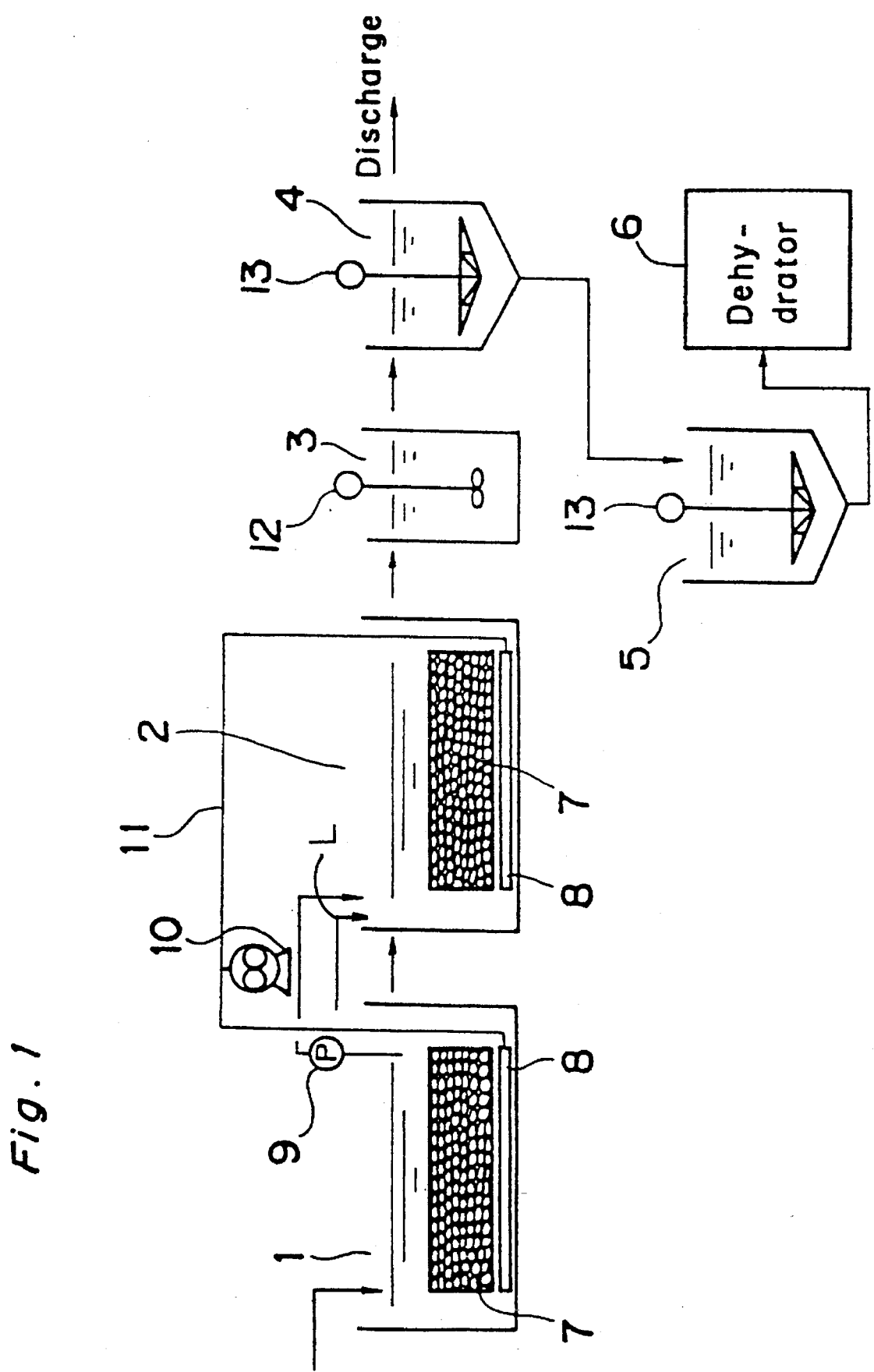
FIG. 1 is a schematic diagram of an apparatus for treatment of waste water containing fluorine and surfactants according to a first embodiment of the present invention.
Figure 8:
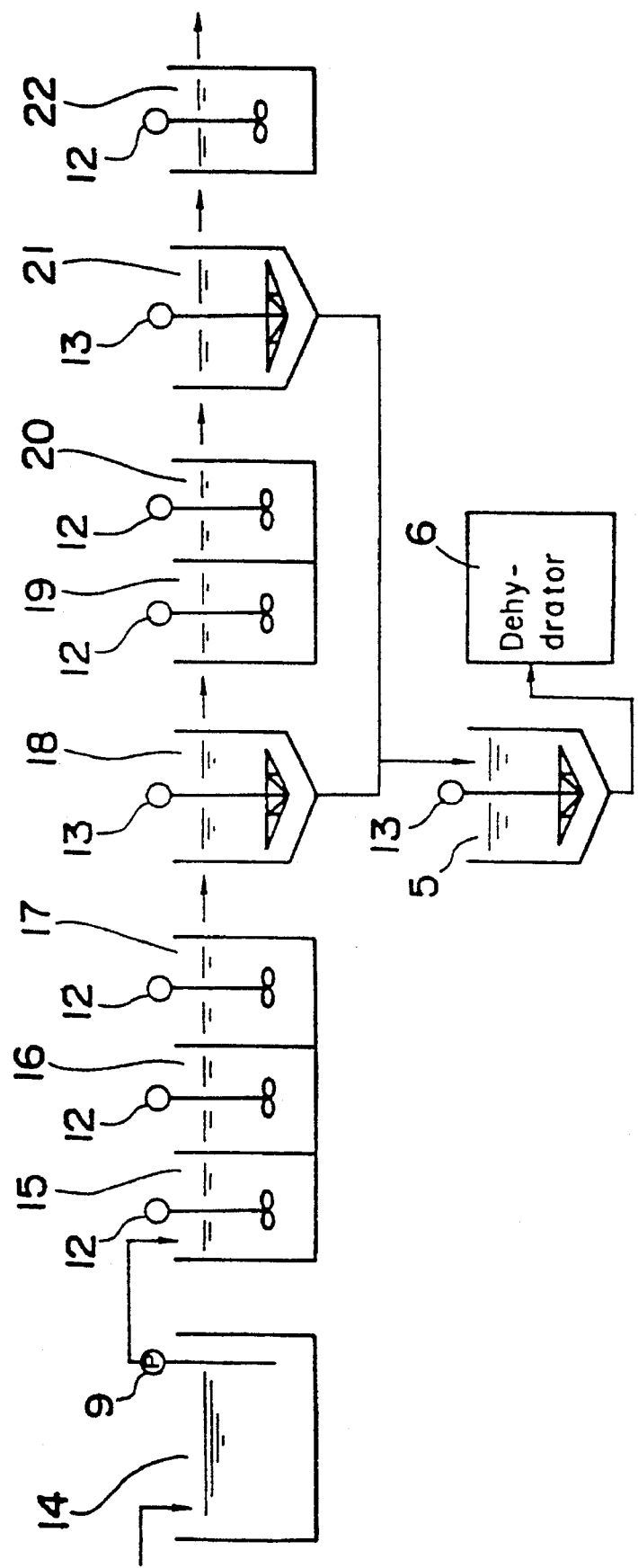
FIG. 8 is a schematic diagram of a prior art apparatus for waste water treatment.
Figure 9:
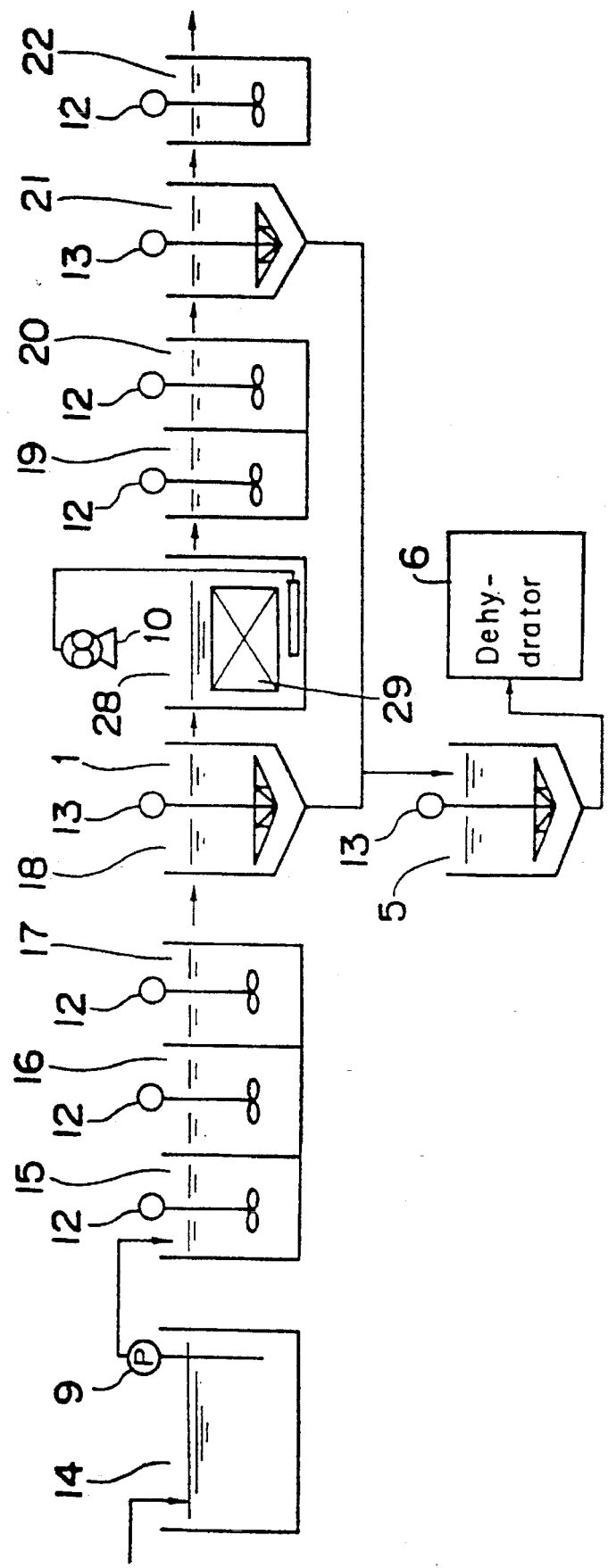
FIG. 9 is a schematic diagram of another prior art apparatus for waste water treatment which includes a biological treating means.
Figure 10:
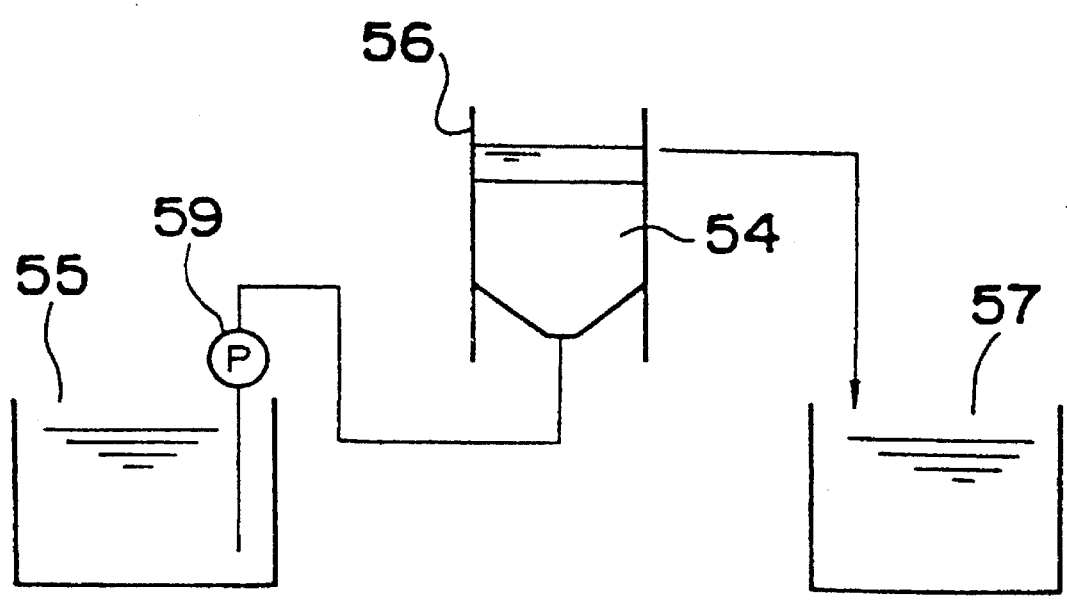
FIG. 10 is a schematic diagram of a prior art waste water treating apparatus for treating hydroxide-containing waste water.

In FIG. 1, numeral 1 designates a first reaction adjustment tank in which is packed a calcium carbonate mineral (i.e., calcite or limestone bed) 7, and which is equipped with an aeration device comprising a blower 10, an air diffuser pipe 8, and a pipe 11 interconnecting the blower 10 and the air diffuser pipe 8. A mechanical agitator 12 as shown in FIGS. 8 and 9 may be employed in place of the aeration device. The water level in the first reaction adjustment tank 1 is so adjusted that the calcium carbonate mineral 7 lies underwater. About 50% of the capacity of the first reaction adjustment tank 1 is employed for adjustment of the volume of waste water. Numeral 2 designates a second reaction adjustment tank in which is also packed the calcium carbonate mineral 7 and to which is added an aluminum agent (not shown), the second reaction adjustment tank 2 being equipped with an aeration device similar to the one in the first reaction adjustment tank 1. The first and second reaction adjustment tanks 1 and 2 are open tanks, so that their maintenance is easy.

The calcium carbonate mineral 7 is grinds of natural lime stone, which are commercially available as heavy calcium carbonate or under the trade name of "Kansuiseki". Whereas slaked lime is strong-alkaline, calcium carbonate mineral, a material that exists in nature, is such a chemically safe material that small fish can be raised in its aqueous solution. Calcium carbonate mineral has a rough surface that facilitates microbial growth.

The particle size of the calcium carbonate mineral 7 packed in the first reaction adjustment tank 1 is greater than that of the calcium carbonate mineral 7 packed in the second reaction adjustment tank 2, because the pH of the waste water, just after its introduction into the tank 1, is 3 or below on the acid side, under which condition coarse particles are preferred. For example, a calcium carbonate mineral having a particle diameter of 5 to 7 cm is used in the first reaction adjustment tank 1, and a calcium carbonate mineral having a particle diameter of about 2 cm is used in the second reaction adjustment tank 2, although these conditions are not essential.

The aluminum agent is effective for fluorine removal where the fluorine concentration is 15 to 20 ppm or less and closer to the neutrality. Therefore, in the first reaction adjustment tank 1 the fluorine concentration is first reduced by calcium carbonate mineral 7 to a level of 15 to 20 ppm and the pH of the waste water is brought closer to 7. Then, for further removal of fluorine, aluminum agent is used in the second reaction adjustment tank 2, so that the fluorine concentration is reduced to a level of about 5 ppm.

In FIG. 1, numeral 3 designates a coagulation tank, numeral 4 designates a first settling tank, numeral 5 designates a sludge concentration tank, numeral 6 designates a dehydrator, numeral 12 designates an agitator, and numeral 13 designates a collector.

The first and second reaction adjustment tanks 1, 2 are each constituted of a raw waste water tank in which is packed a calcium carbonate mineral 7 and which is equipped with agitating means, such as an aeration device or a mechanical agitator. Through this arrangement, the waste water is neutralized and the fluorine contained in the waste water is caused to react with calcium carbonate for reducing the fluorine concentration of the waste water. Therefore, the apparatus can be made smaller in size than apparatus of the conventional type.

For use as agitating means, the aeration device is preferred because it performs agitation aerobically by aeration, which facilitates the inclusion of microorganisms into the waste water.

With the apparatus shown in FIG. 1, waste water is treated as follows.

First, waste water containing fluorine and surfactants thereinafter referred to as waste water) is transferred to the first reaction adjustment tank 1. In this tank 1, the volume of waste water is adjusted so that calcium carbonate mineral 7 lies underwater and then the step of fluorine removal and neutralization by calcium carbonate mineral 7 is carried out until a fluorine concentration of 15 to 20 ppm and a pH value of 4 to 5 are attained. During this stage of operation, the temperature of the waste water may be 20° C. or more, preferably 25° C. or more. Preferably, the stage of neutralization is carried out in a first half portion of the waste water treating apparatus. The reaction time in the first reaction adjustment tank 1 is determined by the fluorine concentration of the waste water, and the quantity and quality of influent waste water, and is considerably longer than that in any conventional method, or usually 12 hours or more. During agitation by aeration, airborne microorganisms become included into the waste water and propagate on the surface of the calcium carbonate mineral 7. The microorganisms perform a buffer action to bring the waste water close to neutrality. Preferably, the air requirement for aeration is designed to be 20 $m^3$ or more per $m^3$ of tank volume per day.

The pH of waste water, immediately after entry thereof into the reaction adjustment tank 1, is 3 or lower on the acid side. Therefore, through ionization of calcium in the course of the calcium carbonate mineral 7 being dissolved, the fluorine in the waste water changes into fine flocs of calcium fluoride, in which process carbon dioxide gas and water are produced. In the past, addition of excess slaked lime ($Ca(OH)_2$) has caused generation of hydroxide. According to the invention, however, in the first reaction adjustment tank 1, sufficient time is allowed for reaction of fluorine with calcium carbonate in exact accordance with the chemical reaction formula. This involves no hydroxide generation and results in less production of dehydrated cake than in the past. Further, the fluorine content of the waste water can be removed by more than 60%.

As a part of the reaction, there will occur a phenomenon that dissolved fluorine reacts with the calcium carbonate mineral into a calcium fluoride mineral (fluorite). This phenomenon may be such that the higher the fluorine concentration in the waste water, the more does the fluorine tend to change into fluorite and not into fine precipitates of calcium fluoride. This fluorite may be reutilized as a material for fluorine production in the cycle of from fluorite to fluorite via hydrofluoric acid, refined hydrofluoric acid, use at IC factories or the like, and waste water.

waste water, when its fluorine concentration is 15 to 20 ppm and its pH has come close to neutrality, is transferred to the second reaction adjustment tank 2, in which polyaluminum chloride or aluminum sulfate, as an aluminum agent, is added via line L to the waste water in the amount of about 500 to 1000 ppm. The retention time for the waste water is preferably 6 hours or more. The aluminum agent reacts with fluorine in the waste water to produce aluminum fluoride, and any excess aluminum agent changes fast into flocs of aluminum hydroxide to which is adsorbed the aluminum fluoride. Thus, the fluorine concentration of the waste water is reduced to about 5 ppm. It is known that flocs of aluminum hydroxide are likely to develop in the vicinity of neutrality.

Addition of an aluminum agent or an acidic chemical lowers the pH of the waste water. To cope with this, a conventional method adds an alkaline chemical, such as caustic soda, to bring the pH of the waste water close to the neutral level. In contrast to this, according to the present invention, calcium carbonate mineral 7 is packed in the first and second reaction adjustment tanks 1 and 2, whereby neutralization by the calcium carbonate mineral 7 and also by airborne microorganisms propagating on the surface of the calcium carbonate mineral 7 is automatically and safely carried out so that the pH of the waste water is brought to a level of about 5.8 to 8.6. Therefore, a pH adjustment tank (shown by reference numeral in FIGS. 8 and 9) which has been required in the prior art is dispensed with.

Thus, in the second reaction adjustment tank 2, the fluorine contained in the waste water can be removed by or more. Further, when organic substances, such as surfactants, are taken as COD (chemical oxygen demand), removal of such substances can be expected to the tune of 40% or more.

Next, the waste water is transferred to the coagulation tank 3, in which a polymer coagulant is added in the amount of about several ppm's, whereby fine flocs developed in the first and second reaction adjustment tanks 1, 2 are grown into large and steady flocs. For agitation in the coagulation tank 3, slow mechanical agitation is suited so as not to break the flocs. The required reaction time may be about 15 minutes.

Then, the waste water is transferred to the settling tank 4, in which solid-liquid separation is carried out by employing a collector 13 operated at a rate of about one turn for each several minutes. A supernatant of the waste water is discharged and, in the sludge concentration tank 5, sludge formed by sedimentation is collected by using the collector 13 and is thickened or concentrated by sedimentation over a time period of 3 hours or more. Subsequently, the sludge concentrated by the above step is dehydrated by the dehydrator 6, such as a filter press, to be formed into a dehydrated cake as a waste.

(Second Embodiment)

Figure 2:
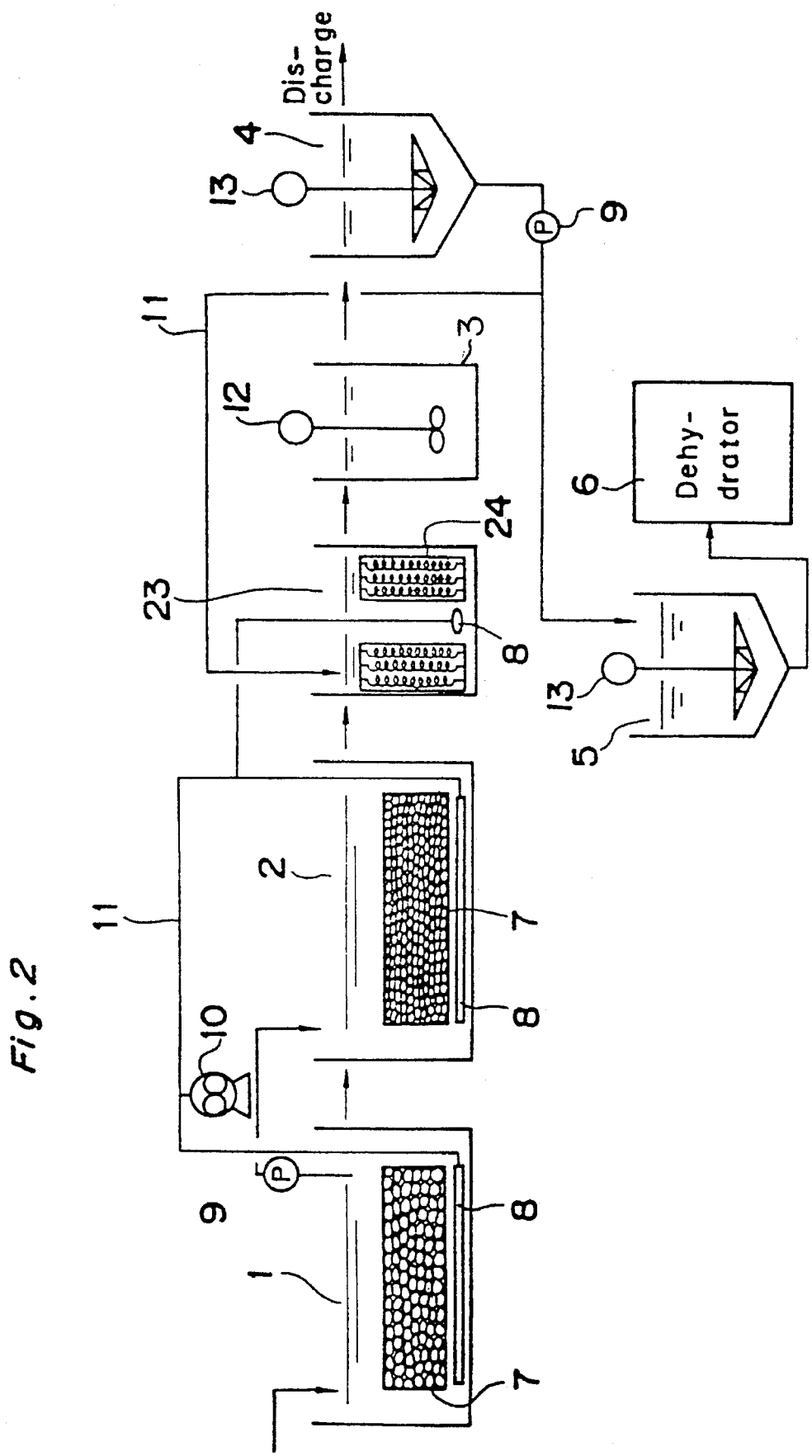
FIG. 2 is a schematic diagram of an apparatus for treatment of waste water containing fluorine and surfactants according to a second embodiment of the present invention.
Figure 11B:
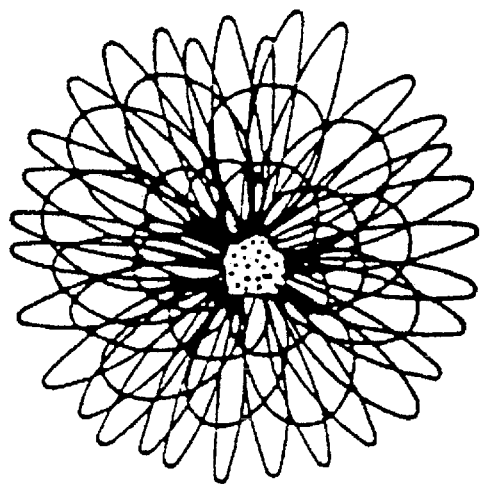
FIG. 11B is an enlarged front view of the vinylidene chloride lace.
Figure 11A:
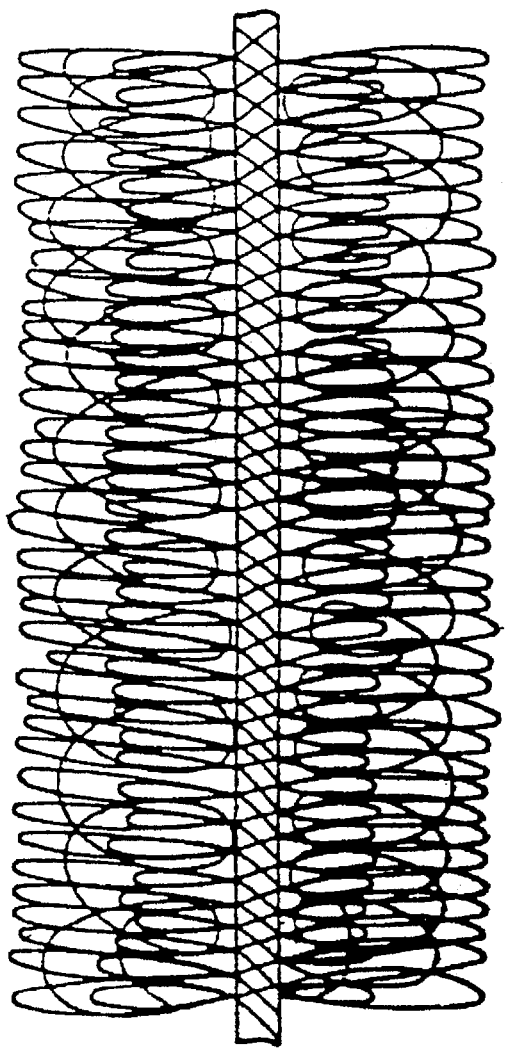
FIG. 11A is a side view of a vinylidene chloride lace.

FIG. 2 shows an apparatus for water treatment of a second embodiment of the invention. The second embodiment apparatus is different from the first embodiment apparatus in that the former includes a sludge immobilizing tank 23 for entry thereinto of waste water from the second reaction adjustment tank 2 and of sludge from the settling tank 4. The sludge immobilizing tank 23 is packed with a contactor 24 for immobilizing sludge circulated from the settling tank 4. For the contactor 23 may be used, besides vinylidene chloride, any material of light weight having good corrosion resistance, and high alkali- and acid-resistance. Preferably, the contactor has a wider area of contact with sludge. In particular, a string-like article of vinylidene chloride having a multiplicity of radial loop elements, shown in FIGS. 11A and 11B, may be utilized as such.

Next, the process of waste water treatment in the second embodiment apparatus shown in FIG. 2 will be explained below.

First, as in the same manner as in the first embodiment, waste water is entered into the first reaction adjustment tank 1, in which fluorine removal and neutralization by calcium carbonate mineral 7 is carried out. For example, under the conditions of the air requirement for aeration being 20 $m^3$ or more per day for each $m^3$ of tank capacity, an influent with a fluorine concentration of 100 ppm and a pH value of 2.5 will be of 40 ppm or less, with a pH value of 4 to 5, at the outlet port of the first reaction adjustment tank 1.

Then, the waste water whose fluorine concentration is 40 ppm is transferred to the second reaction adjustment tank 2, in which polyaluminum chloride or aluminum sulfate as an aluminum agent is added to the waste water, whereby the fluorine concentration of the waste water is reduced to about 16 ppm and the pH thereof is brought to a level of 5 to 7.

Then, the waste water is transferred through the sludge immobilizing tank 23 to the coagulation tank 3, in which fine flocs developed in the first and second reaction adjustment tanks 1 and 2 are grown into large and steady flocs by a polymer coagulant.

Then, the waste water is transferred to the settling tank 4, in which solid-liquid separation is carried out by employing a collector 13 operated at a rate of about one turn for each several minutes. A supernatant of the waste water is discharged and any sludge formed by sedimentation which contains unreacted aluminum and/or calcium and fluorine is returned to the sludge immobilizing tank 23.

The rate of sludge return is initially 100%. However, when the sludge concentration in the sludge immobilizing tank 23 is 3000 ppm or more, operation at the sludge return rate of 100% may involve sludge inclusion in the waste water in the coagulation tank 3 and in the supernatant in the settling tank 4. Therefore, the rate of sludge return is lowered to a range within which sludge is unlikely to become included in the waste water in the coagulation tank 3 and in the supernatant in the settling tank 4. During this process, 30% or more of the sludge is fixedly attached to the contactors 24 in the sludge immobilizing tank 23, and anaerobic microorganisms propagate in gaps present in the contactors 24, digesting sludge to decrease the quantity of sludge.

In the sludge immobilizing tank 23, the fluorine contained in the waste water can be removed by 60% or more. Further, when organic substances, such as surfactants, are taken as COD, removal of such substances can be expected to the tune of 40% or more.

Next, in the same manner as in the first embodiment, sludge is concentrated in the sludge concentration tank 5, and the concentrated sludge is dehydrated into a dehydrated cake by the dehydrator 6.

When the first reaction adjustment tank has a capacity of about 5 liters, the second reaction adjustment tank 2 has a capacity of about 5 liters, the sludge immobilizing tank 23 having a capacity of about 2.5 liters, and a settling tank 4 has a capacity of about 3 liters, waste water containing fluorine and surfactants, with a pH value of 2.4, a fluorine concentration of 135 ppm, and a COD value of 26 ppm, can be treated to a such a good quality level that the pH is 7.6, fluorine concentration is 5.7 ppm, and COD is 5.3 ppm, as compared with a quality level attainable by the prior art, say, a pH value of 7.4, a fluorine concentration of 6.5 ppm, and a COD value of 5.7 ppm. The quantity of sludge generation is about 30% or less of that according to the prior art.

(Third Embodiment)

Figure 3:
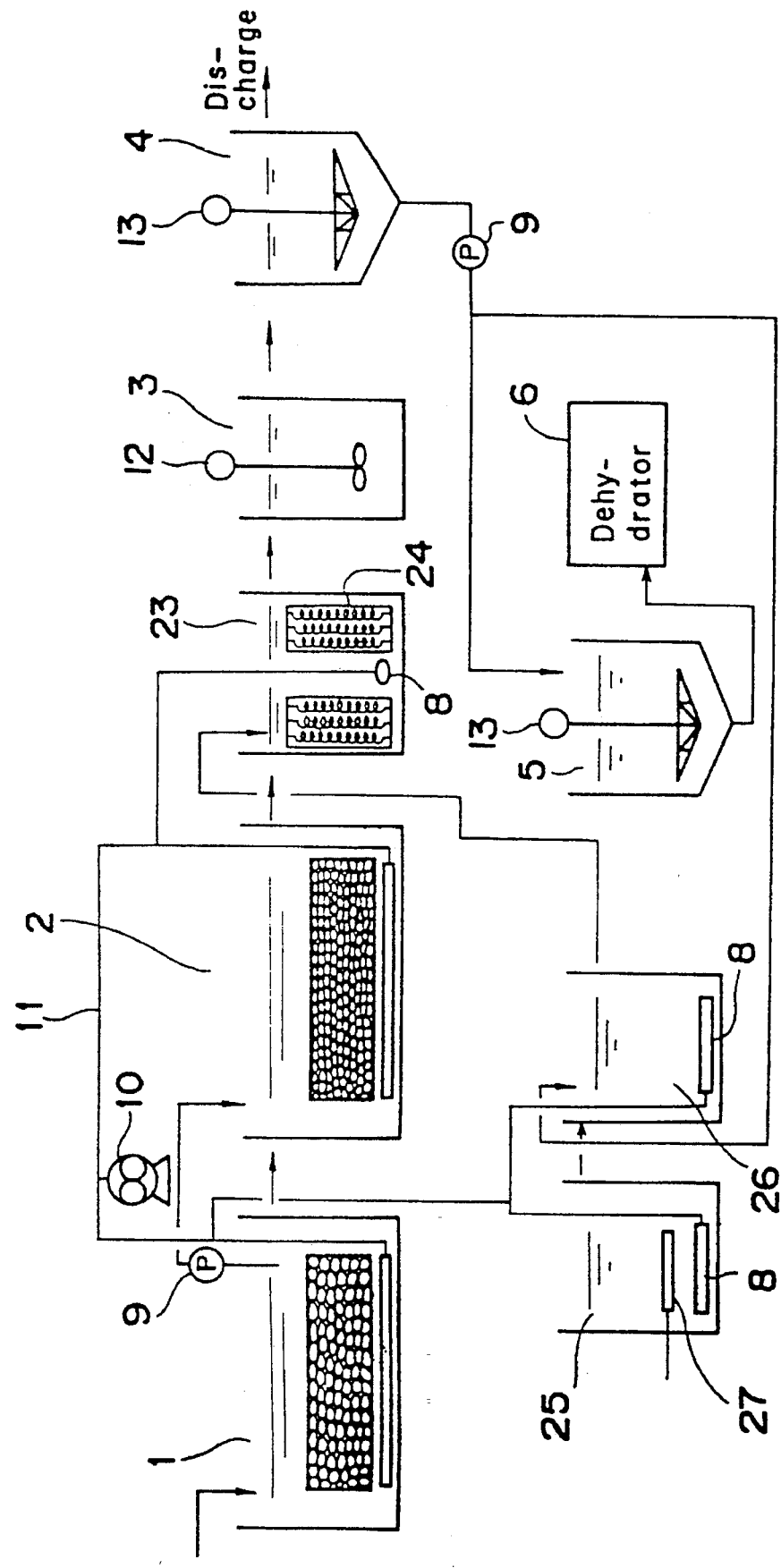
FIG. 3 is a schematic diagram of an apparatus for treatment of waste water containing fluorine and surfactants according to a third embodiment of the present invention.

FIG. 3 shows an apparatus for waste water treatment of a third embodiment of the invention. In addition to the constituent parts of the second embodiment apparatus, the third embodiment apparatus further includes a warming device 27, a BSK bacteria culture tank 25 loaded with BSK bacteria or with BSK (*Bacillus subtilis* Kubota) bacteria and domestic excess sludge as nutrients for the BSK bacteria, and a sludge/microorganism mixing tank 26 for mixing BSK bacteria from the BSK bacteria culture tank 25 with sludge from the settling tank 4. The BSK bacteria are commercially available. It is noted that BSK bacteria, as a species of *Bacillus subtilis* which exists in nature, are aerobic bacteria and are highly capable of eliminating odor so that they effectively remove odor emitted from domestic excess sludge.

In the third embodiment, waste water is treated as follows.

First, as in the same manner as in the first and second embodiments, waste water is entered into the first reaction adjustment tank 1, in which fluorine removal and neutralization by calcium carbonate mineral 7 is carried out. For example, under the conditions of the air requirement for aeration being 20 $m^3$ or more per day for each $m^3$ of tank capacity, an influent with a fluorine concentration of 120 ppm and a pH value of 2.5 will be of 48 ppm or less, with a pH value of 4 to 5, at the outlet port of the first reaction adjustment tank 1.

Then, the waste water whose fluorine concentration is 48 ppm is transferred to the second reaction adjustment tank 2, in which polyaluminum chloride or aluminum sulfate as an aluminum agent is added to the waste water, whereby the fluorine concentration of the waste water is reduced to about 19.2 ppm and the pH thereof is brought to a level of 5 to 7.

Then, the waste water is transferred through the sludge immobilizing tank 23 to the coagulation tank 3, in which fine flocs developed in the first and second reaction adjustment tanks 1 and 2 are grown into large and steady flocs by a polymer coagulant.

Then, the waste water is transferred to the settling tank 4, in which solid-liquid separation is carried out by employing a collector 13 operated at a rate of about one turn for each several minutes. So far, the treatment process is the same as that carried out in the second embodiment.

A supernatant of the waste water is discharged and any sludge formed by sedimentation which contains unreacted aluminum and/or calcium and fluorine is transferred to the sludge/microorganism mixing tank 26, and mixed with BSK bacteria only or domestic excess sludge and BSK bacteria which are received from the BSK bacteria culture tank 25 equipped with a warming device 27 for effective culturing and an air diffuser tube 8 for maintenance of aerobic conditions. The resulting mixture is circulated to the sludge immobilizing tank 23.

The rate of sludge return from the sludge/microorganism mixing tank 26 to the sludge immobilizing tank 23 is initially 100%. However, when the sludge concentration in the sludge immobilizing tank 23 is 4000 ppm or more, operation at the sludge return rate of 100% may involve sludge inclusion in the waste water in the coagulation tank 3 and in the supernatant in the settling tank 4. Therefore, the rate of sludge return is lowered to a range within which sludge is unlikely to become included in the waste water in the coagulation tank 3 and in the supernatant in the settling tank 4 as described above in connection with the second embodiment In this third embodiment, operation at a sludge return rate of 100% can be maintained until the sludge concentration in the sludge immobilizing tank 23 is 4000 ppm, whereas in the second embodiment the rate of sludge return is controlled to be lowered when the sludge concentration reaches 3000 ppm or more. The reason for this is that BSK bacteria having stickiness on their colony per se are mixed in each returned sludge, which fact permits sludge to be immobilized to contactors 24 in higher concentration- During this process, 60% or more of the sludge is attached to contactors 24 made of vinylidene chloride and immobilized, and anaerobic microorganisms propagate in gaps present in the contactors 24, digesting sludge to decrease the quantity of sludge. This results in reduced sludge production as compared with the level of sludge production by the second embodiment.

In the sludge immobilizing tank 23, the fluorine contained in the waste water can be removed by 70% or more. Further, when organic substances, such as surfactants, are taken as COD, removal of such substances can be expected to the tune of 50% or more.

Next, in the same manner as in the foregoing embodiments, sludge is transferred to the sludge concentration tank 5 so as to be concentrated therein, and the concentrated sludge is dehydrated by the dehydrator 6 to finally become a dehydrated cake.

When the above described treating process of the third embodiment is practiced by employing, for example, a first reaction adjustment tank 1 having a capacity of about 5 liters, a second reaction adjustment tank 2 having a capacity of about 5 liters, a sludge immobilizing tank 23 having a capacity of about 2.5 liters, and a settling tank 4 having a capacity of about 3 liters, waste water containing fluorine and surfactants, with a pH value of 2.2, a fluorine concentration of 152 ppm, and a COD value of 41 ppm, can be treated to such a good quality level such that the pH is 7.5, fluorine concentration is 5.1 ppm, and COD is 5.2 ppm, as compared to a quality level attainable by the prior art, say, a pH value of 7.3, a fluorine concentration of 6.8 ppm, and a COD value of 6.5 ppm. The quantity of sludge generation is about 20% or less of that according to the prior art.

(Fourth Embodiment)

Figure 4:
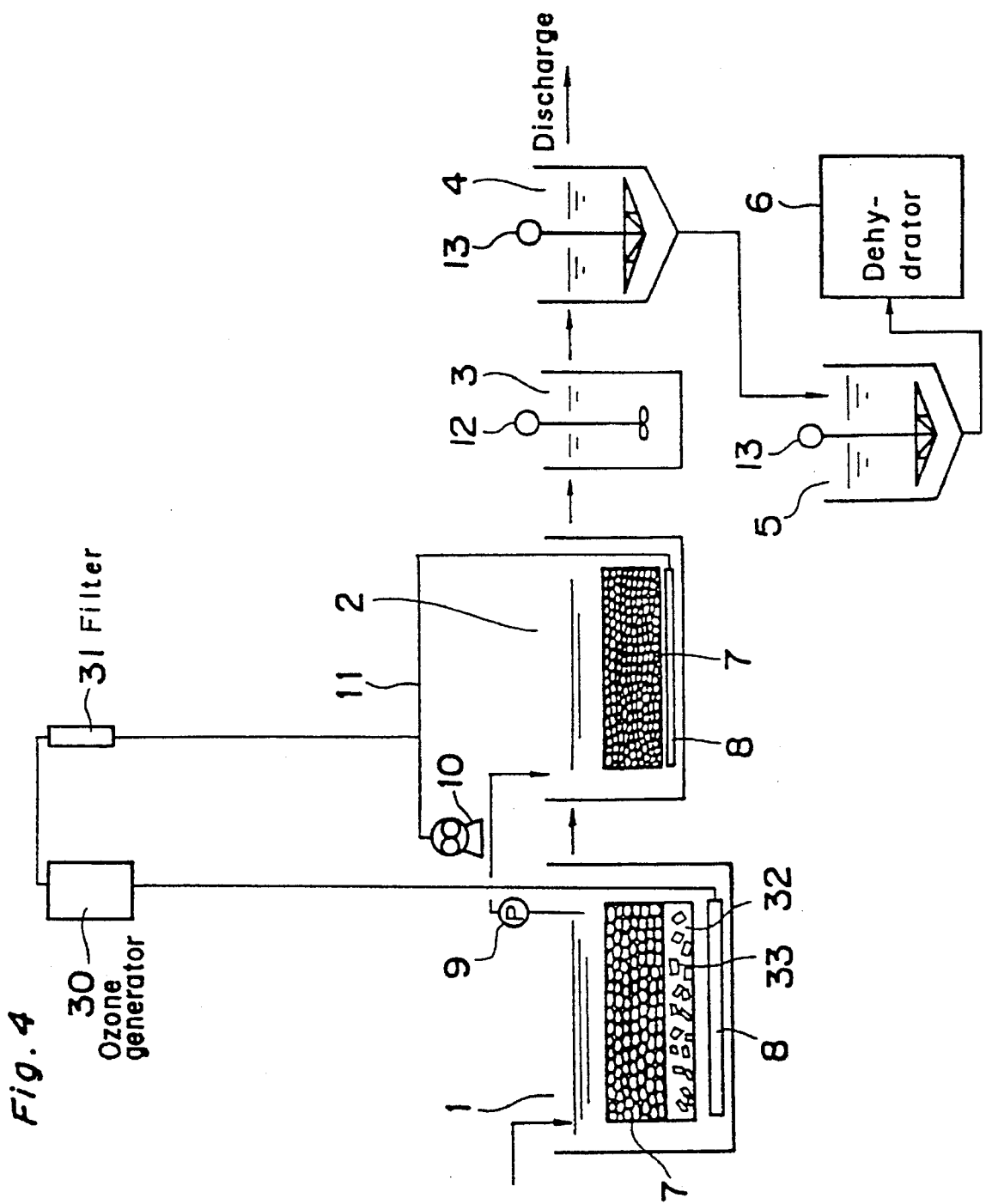
FIG. 4 is a schematic diagram of an apparatus for treatment of waste water containing fluorine and surfactants according to a fourth embodiment of the present invention.

FIG. 4 shows an apparatus for waste water treatment of a fourth embodiment. The fourth embodiment apparatus is different from the first embodiment apparatus in that the former further includes a filter 31 for removing air-borne dirts from waste water and an ozone generator 30, both the filter 31 and the ozone generator 30 being disposed midway on an air pipeline connecting the blower 10 and the air diffuser pipe 8 in the first reaction adjustment tank 1. The air diffuser pipe 8 emits ozone-containing air. In order to allow more ozone to be dissolved in water, ceramic or plastic packings 33 of the type which is often used in a scrubber for air treatment are packed in an ozone mixing portion 32 in the first reaction adjustment tank 1. The packings 33 include, in particular, Raschig ring, Berl saddle, Interlock saddle, Tellerette, and Pall rings. This arrangement provides for improvement in vapor-liquid reaction efficiency.

Ozone generation of 20 mg/h or more for 1 $m^3$ of waste water is more effective than otherwise. An optimum value of ozone generation may be preliminarily determined by experiments on the basis of fluorine concentration and COD concentration of waste water.

In the apparatus of FIG. 4, waste water is treated as follows.

First, waste water is transferred to the first reaction adjustment tank 1 in the same manner as in the first embodiment. In this tank 1, the volume of waste water is adjusted so that calcium carbonate mineral 7 lies underwater and then, the step of fluorine removal and neutralization by the calcium carbonate mineral 7 is carried out until a fluorine concentration of 15 to 20 ppm and a pH value of 4 to 5 are attained. During this stage of operation, the temperature of the waste water may be 20° C. or more, preferably 25° C. or more. Preferably, the stage of neutralization is carried out in a first half portion of the waste water treating system. The reaction time in the first reaction adjustment tank 1 is determined by the fluorine concentration of the waste water, and the quantity and quality of waste water influent, and is considerably longer than that in any conventional method, or usually 10 hours or more. During agitation by aeration, the waste water is aerated by ozone-containing air and, therefore, organic substances, such as surfactants, are positively oxidized by ozone, with the result that the COD value of the waste water is lowered.

The pH of waste water, immediately after entry hereof into the reaction adjustment tank 1, is 3 or lower on the acid side. As such, through ionization of calcium in the course of the calcium carbonate mineral 7 being dissolved, the fluorine in the waste water forms fine flocs of calcium fluoride. As a part of the reaction, there also occurs a reaction that dissolved fluorine reacts with the calcium carbonate mineral to change into a calcium fluoride mineral useful as a material for fluorine production. Therefore, no precipitate of calcium fluoride is generated. In other words, the invention provides for a system which can minimize the generation of waste, if any. In this case, the ozone-containing air performs a catalytic action in connection with the above noted change from calcium carbonate mineral to calcium fluoride mineral.

Preferably, the requirement of ozone-containing air is designed to be 20 m³ per day for each m³ of tank capacity. The tank is preferably so configured as to permit the waste water to come in as much contact as possible with ozone-containing air and is also preferably rendered deeper than one employed in the case of aerated agitation being effected by air containing no ozone.

In the ozone mixing portion 32 which is packed with fillers 33, ozone-containing air comes in efficient contact with the waste water for good air-liquid contact.

Thus, in the first reaction adjustment tank 1, the fluorine contained in the waste water is treated by 60% or more, and organic substances in the waste water, such as surfactants and alcohols, are oxidized by ozone, and when they are taken as COD, a removal ratio of 20% or more can be expected with respect to the COD.

Waste water, when its fluorine concentration is 15 to 20 ppm and its pH has come close to neutrality, is transferred to the second reaction adjustment tank 2, in which polyaluminum chloride or aluminum sulfate, as an aluminum agent, is added to the waste water in the amount of about 500 to 1000 ppm. The retention time for the waste water is preferably 6 hours or more. The aluminum agent reacts with fluorine in the waste water to produce aluminum fluoride, and any excess aluminum agent changes fast into flocs of aluminum hydroxide to which is adsorbed the aluminum fluoride. Thus, the fluorine concentration of the waste water is reduced to about 5 ppm. It is known that flocs of aluminum hydroxide are likely to develop in the vicinity of neutrality. The aeration air in the second reaction adjustment tank 2 contains no ozone and, therefore, the ozone which has been contained in the first reaction adjustment tank 1 is deaerated in the second reaction adjustment tank 2, so that the effect of ozone upon microorganisms present in the second and subsequent tanks is inhibited. The process of aerated agitation by ozone-containing air for the first reaction adjustment tank 1 may be applied to the second and third embodiments shown in FIGS. 2 and 3, with a similar effect.

In the second reaction adjustment tank 2, the fluorine contained in the waste water can be removed by 60% or more. Further, when organic substances, such as surfactants, are taken as COD (chemical oxygen demand), removal of such substances can be expected to the tune of 35% or more, allowing for some effect of ozone upon microorganisms.

The subsequent process of the waste water is the same as that in the first embodiment and a detailed description is omitted here.

When the above described treating process is practiced by employing, for example, a first reaction adjustment tank 1 having a capacity of about 5 liters, a second reaction adjustment tank 2 having a capacity of about 5 liters, a coagulation tank 3 having a capacity of about 1 liter, and a settling tank 4 having a capacity of about 3 liters, waste water containing fluorine and surfactants, with a pH value of 2.4, a fluorine concentration of 135 ppm, and a COD value of 26 ppm, can be treated to a quality level that the pH is 7.1, fluorine concentration is 5.3 ppm, and COD is 4.8 ppm, as compared with a quality level attainable by the prior art, say, a pH value of 7.4, a fluorine concentration of 6.5 ppm, and a COD value of 5.7 ppm. The quantity of sludge generation is about 20% or less of that according to the prior art.

(Fifth Embodiment)

Figure 5:
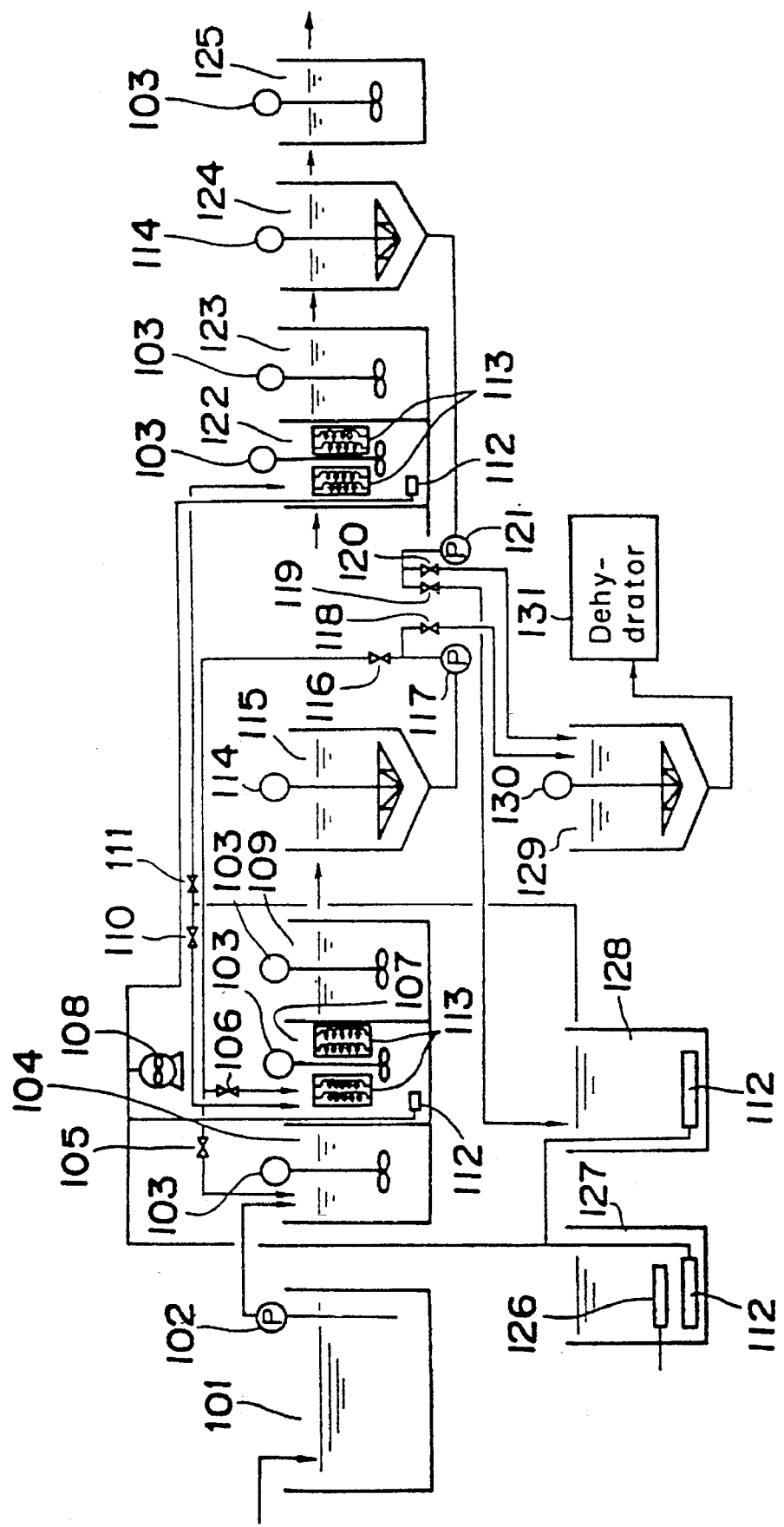
FIG. 5 is a schematic diagram of an apparatus for treatment of waste water containing fluorine and surfactants according to a fifth embodiment of the present invention.

FIG. 5 shows an apparatus for waste water treatment of a fifth embodiment of the invention. The apparatus is used especially in semiconductor and/or liquid crystal factories.

In FIG. 5, numeral 101 denotes a raw waste water tank. Waste water containing fluorine and surfactants that is discharged from the semiconductor factory or the like first flows into the raw waste water tank 101. In this raw waste water tank 101, the fluorine-containing waste water is adjusted in both quantity and quality. For this reason, the raw waste water tank 101 may sometimes be called an adjustment tank. The retention time for waste water in the raw waste water tank 101 is generally set at several hours or more, though it may vary depending upon fluctuations in the quality of influent waste water. An investigation at the semiconductor or liquid crystal factory as to changes with time in fluorine concentration, surfactant concentration, and pH values in the raw waste water tank 1 will tell that there are substantial fluctuations with time in such water quality. The reason for such fluctuations is that since the factory has many production units in operation, there is no timing or time period established for discharge of water used in conjunction with chemicals used in each respective production unit. The waste water which has been subjected to some adjustment in quality and volume in the raw waste water tank 101 is transferred to a first reaction tank 104 by means of a raw waste water tank pump 102. In the first reaction tank 104, to which is added slaked lime, the fluorine in the waste water reacts with calcium in the slaked lime to produce calcium fluoride. The time period for this reaction is generally selected to be 15 minutes or more.

In the first reaction tank 104, not only is calcium fluoride produced by the reaction of the fluorine in the waste water with the calcium in the slaked lime, but also the pH of the waste water is neutralized by the slaked lime. Usually, therefore, the quantity of slaked lime addition at the first reaction tank 104 is regulated on the basis of the fluorine concentration and pH of the waste water. That is, the addition of slaked lime is intended not only for decreasing the fluorine concentration in the waste water, but also for neutralizing the waste water of which the pH is on the acid side.

Where slaked lime is used in this way to neutralize Waste water, a large amount of slaked lime must be consumed in the prior art apparatuses shown in FIGS. 8 and 9, which naturally results in a large sludge production.

In the present example, however, any sludge containing unreacted slaked lime, from a first settling tank 115 is returned to the first reaction tank 104 through a first settling tank pump 117 with valves 116 and 105 open, and this results in a substantial decrease in the amount of fresh slaked lime addition from the prior art level. In this example, the rate of sludge return to the first reaction tank 104 is set at 30% or less. The measured pH value of the sludge returned from the first settling tank 115 is within a range of 8 to 9.5 which is rather high, but nevertheless the returned sludge serves to neutralize waste water. For example, when a returned sludge of pH 8 to 9.5 is added to waste water of pH 2 to 3 by an amount corresponding to 30% of the waste water, the pH of the waste water changes to a pH level of 3 to 5. The above mentioned rate of sludge return is adjusted by the valve travel of valves 105 and 106 shown in FIG. 5.

The waste water that has been subjected to preliminary fluorine treatment and neutralized by slaked lime and returned sludge in the first reaction tank 104 is introduced into a first inorganic and biological sludge immobilizing tank 107. In this first inorganic and biological sludge immobilizing tank 107 is carried out treatment of not only fluorine but also surfactants in the waste water. It is arranged that inorganic sludge whose principal ingredients are aluminum and calcium, and biological sludge or fresh activated sludge whose main ingredients are BSK bacteria, are circulated from an inorganic and biological sludge mixing tank 128 to the first inorganic and biological sludge immobilizing tank 107. Operation of the first inorganic and biological sludge immobilizing tank 107 with MLSS (Mixed Liquor Suspended Solids) concentration therein maintained at 5000 ppm or more provides for further improvement in the treatment of fluorine and organic matter, such as surfactants, in the waste water. The proportions of inorganic sludge and biological sludge in the first inorganic and biological sludge immobilizing tank 107 may be determined on the basis of respective concentrations of fluorine and organic matter in the incoming waste water.

Air diffuser pipes 112 disposed respectively in the first inorganic and biological sludge immobilizing tank 107 and a second inorganic and biological sludge immobilizing tank 122 are intended to maintain dissolved oxygen in the tanks 107 and 122 at a minimum concentration level that will allow active propagation of microorganisms. In the first inorganic and biological sludge immobilizing tank 107, vigorous agitation is provided by air blown from the air diffuser pipe 112 and the agitating action of an agitator 103 to accelerate the reaction of fluorine with calcium and of fluorine with aluminum, and also the reaction of surfactants with microorganisms. The air requirements for these reactions may be sufficiently met by a supply of 15 $m^3$ or more per day for each $m^3$ of the capacity of the tank 107. The same applies to the second inorganic and biological sludge immobilizing tank 122. The time period for waste water reaction, or retention time for waste water, in the tanks 107, 122 is usually in the range of about 15 minutes to 30 minutes.

Next, the waste water treated in the first inorganic and biological sludge immobilizing 107 is introduced into a first coagulation tank 109, in which calcium fluoride, aluminum fluoride, biological sludge, etc. are collected by a polymer coagulant. The amount of the polymer coagulant for addition to the first coagulating tank 109 is suitably selected within the range of about 1 to 5 ppm relative to the volume of waste water introduced into the tank.

Then, the treated waste water is introduced into a first settling tank 115. A sludge collector 114 is disposed within the first settling tank 115. In this first settling tank 115, the treated water is separated by sedimentation into supernatant and sludge.

The sludge separated by sedimentation is transferred by the first settling tank pump 117 to at least one of the first reaction tank 104, first inorganic and biological sludge immobilizing tank 107, and sludge concentration tank 129. The quantity of sludge to be so transferred may be adjusted by adjusting the valve travel of valves 116, 118, 105, and 106. The sludge concentration tank 129 operates in the same manner as the sludge concentration tanks of the foregoing embodiments. In this transfer or circulation, 100% of the sludge generated is returned to the first reaction tank 104 or first inorganic and biological sludge immobilizing tank 107 during the stage of trial operation. Thereafter, when the sludge concentration of the first inorganic and biological sludge immobilizing tank 107 has reached a level of 5000 ppm or more or when there is no longer unreacted aluminum or calcium, it is necessary to draw the sludge into the sludge concentration tank 129. In the present example, it is arranged that 20 to 40% of the volume of sludge in the first settling tank 115 is drawn into the sludge concentration tank 129. In contrast, the prior art waste-water treating apparatuses shown in FIG. 8 and 9 are of such arrangement that sludge is withdrawn constantly 100% from the first settling tank. As such, the quantity of final waste from such waste water apparatus is considerably greater than that in the present example. Therefore, a dehydrator 131 in the FIG. 5 embodiment of the invention may have a treating capacity of only 50% or less of that of the dehydrator 6 in the prior art arrangement shown in FIG. 8 or 9 to sufficiently meet the treating requirements.

Next, treated waste water is introduced from the first settling tank 115 into the second inorganic and biological sludge immobilizing tank 122. This second inorganic and biological sludge immobilizing tank 122 is different from the first inorganic and biological sludge immobilizing tank 107 in the components of inorganic sludge immobilized therein. That is, the inorganic sludge immobilized in the second inorganic and biological sludge immobilizing tank 122 is composed almost entirely of aluminum, the time period for reaction in the second inorganic and biological sludge immobilizing tank 122 is usually 15 to 30 minutes. The second inorganic and biological sludge immobilizing tank 122 is loaded with a fresh supply of aluminum agents, such as polyaluminum chloride, aluminum sulfate and the like. However, in the present embodiment, loading or addition of such aluminum agents is considerably smaller in amount than in the prior art. The reason for this is that in the immobilizing tank 122 are packed fibrous vinylidene chloride fillers 113 to which unreacted aluminum particles are previously immobilized in a high concentration so as to enhance aluminum reactivity, such reacted aluminum being utilized for treatment of fluorine in waste water. Stated more correctly, the above mentioned immobilized aluminum particles are immobilized aluminum hydroxide particles. The vinylidene chloride fillers 113 are selected for use in immobilizing aluminum hydroxide particles. Each vinylidene chloride filler 113 is a tough, fibrous element having multiple radially looped elements and has a broad surface area due to its configuration. Therefore, the vinylidene chloride fillers 113 tend to allow aluminum hydroxide particles to be attached thereto.

In the present example, for purposes of causing aluminum hydroxide particles to be attached to the vinylidene chloride fillers 113 more efficiently and in larger quantities, it is intended that a new, sticky inorganic and biological sludge is generated in the second inorganic and biological sludge immobilizing tank 122 by best utilizing the sticking behavior of BSK bacterial colonies.

In the present example, flocs of sludge composed principally of aluminum hydroxide from a second settling tank 124 are directed through a second settling tank pump 21 into an inorganic and biological sludge mixing tank 281, in which the sludge composed principally of aluminum hydroxide, together with a new active sludge composed principally of BSK bacteria supplied from a BSK bacteria culture tank 127, is subjected sufficiently to aerated agitation. Thereafter, the aeroagitated sludge is circulated to the second inorganic and biological sludge immobilizing tank 122 for generation therein of inorganic and biological sludge.

Similarly, inorganic sludge coming from the first settling tank 115 is subjected to aerated agitation along with active sludge composed principally of BSK bacteria in the inorganic and biological sludge mixing tank 128 to form sticky new sludge.

Sticky new sludge from the inorganic and biological sludge mixing tank 128 is introduced into the first inorganic and biological sludge immobilizing tank 107 or second inorganic and biological sludge immobilizing tank 122, the amount of such sludge introduction being controlled by adjusting the valves 110, 111 as to their valve travel. In the present example, where the waste water in the raw waste water tank 101 involves wide quality fluctuations, sludge containing aluminum in a large amount may be introduced into the first inorganic and biological sludge immobilizing tank 107, whereby the fluorine treated quality of the waste water in the first settling tank 115 can be improved. The retention time for treated water in the first settling tank 115 may be 10 minutes or more, which time period is quite sufficient for the purpose.

Domestic excess sludge, as a source of nutrients for BSK bacteria, is introduced into the BSK bacteria culture tank 127. The BSK bacteria culture tank 127 is equipped with a warming unit 126 by which the temperature of the water in the tank 127 can be raised to a level suitable for propagation of BSK bacteria. Since BSK bacteria are aerobic, it is arranged that air from a blower 108 is discharged into the BSK bacteria culture tank 127 through an air diffuser pipe 112 so as to maintain the interior of the BSK bacteria culture tank 127 in an aerobic condition. BSK bacteria are introduced from the BSK bacteria culture tank 127 into the inorganic and biological sludge mixing tank 128.

In FIG. 5, numeral 123 is a second coagulation tank. Treated water is introduced from the second inorganic and biological sludge immobilizing tank 122 into the second coagulation tank 123. In this second coagulation tank 123, several ppm's of a polymer coagulant is added to coagulate small flocs of sludge which have been detached in the second inorganic and biological sludge immobilizing tank 122. The retention time for treated water in the second coagulation tank 123 is set at about 15 minutes.

Then, treated water is introduced into the second settling tank 124. In the second settling tank 124, the waste water that has passed through the coagulation process in the second coagulation tank 123 is separated into liquid and solid portions, that is, supernatant and precipitate. After the process of solid-liquid separation in the second settling tank 124, treated water in the form of supernatant is subjected to pH determination in a neutralization tank 125 and, if the pH of the treated water is not within a predetermined pH range (e.g., 5.8 to 8.6), the treated water is neutralized in the neutralization tank 125 before it is discharged.

In FIG. 5, numeral 131 indicates a dehydrator. Sludge that has been concentrated by a sludge collector in a sludge concentration tank 129 is introduced into the dehydrator 131. The sludge is dehydrated by the hydro-extractor 131 until a target water content is reached. Generally, in semiconductor and liquid crystal factories, a filter press is used as the dehydrator 131, by which the sludge is to be dehydrated to a water content of about 65%.

According to the above exemplified waste water treating method in which the waste water treating apparatus of FIG. 5 is employed, where the fluorine concentration of waste water introduced into the raw waste water tank 101 is 120 ppm, for example, the fluorine concentration in the neutralization tank 125, a final-stage tank, is not more than 10 ppm. Where organic matter, such as a surfactant, is taken as COD, a COD value of 20 ppm of influent waste water at the raw waste water tank 101 is reduced to as low as 8 ppm or less at the outlet port of the neutralization tank 125.

In the prior art waste water treatment system shown in FIGS. 8 and 9 each, it is impracticable to properly control the addition of slaked lime because of the fact that fluorine-containing waste water that flows from the raw waste water tank 14 into the first reaction tank 15 involves fluctuations in fluorine concentration and pH. Necessarily, therefore, an excessive amount of slaked lime is added in order to attain a predetermined quality level of treated waste water. More particularly, it has been customary to add even three times as much slaked lime as a stoichiometric quantity for the fluorine/slaked lime reaction. This has resulted in generation of large amounts of unreacted calcium sludge, which in turn has resulted in generation of large amounts of dehydrated cake as an industrial waste.

In contrast to this, according to the present example, unreacted calcium and aluminum in returned sludge are immobilized in the first and second inorganic and biological sludge immobilizing tanks 107, 122, whereby the reactivity of fluorine with calcium and aluminum is improved. Thus, excessive use of slaked lime is avoided, and generation of wastes is considerably reduced.

Primarily, the vinylidene chloride fillers 113 packed in the inorganic and biological sludge immobilizing tanks 107, 122 are fibrous, radial, loop-shaped fillers and provide a large surface area which allows returned sludge containing aluminum and calcium and biological sludge composed principally of BSK bacteria to be attached thereto and immobilized. Further, in the present example, cohesion characteristics of BSK bacterial colonies are advantageously utilized so that a concentration level of 5000 ppm or more is attained with respect to the sludge concentration in the first and second inorganic and biological sludge immobilizing tanks 107, 122. Experimentally, in the present example, while in continuous operation of the apparatus, not less than 60% of the sludge in the inorganic and biological sludge immobilizing tanks 107, 122 is immobilizingly attached to the vinylidene chloride fillers. In particular, because of the cohesion characteristics of BSK bacterial colonies, such sludge is effectively caused to be attached to the vinylidene chloride fillers 113 for immobilization. As a consequence, sludge concentration in the inorganic and biological sludge immobilizing tanks 107, 122 is enhanced. During a test and adjustment run, operation is made at a sludge return rate of 100%, that is, 100% of sludge is returned from the first settling tank 115 to the first reaction tank 104 and first inorganic and biological sludge immobilizing tank 107 by the first sedimentation pump 117. Thereafter, when the sludge concentration in the inorganic and biological sludge immobilizing tank 107 has reached 5000 ppm or more, operation is made at a reduced rate of sludge return.

With the first reaction tank 104 and two-stage inorganic and biological sludge immobilizing tanks 107, 122 in combination, a fluorine removal rate of not less than 90 can be expected for the entire system. On the other hand, a removal rate of not less than 60% can be expected with respect to surfactants and other organic matter. Naturally, sludge generation by the treating apparatus in the present embodiment is by far much smaller than that by the prior art treating system. In more concrete terms, sludge generation in the present embodiment is 60% or less of that in the prior art. The reason for this is that whereas in the prior art treating system, brand-new chemicals, such as slaked lime, polyaluminum chloride, caustic soda, polymer coagulant, and hydrochloric acid, are used by addition in large quantities, in the present example, unreacted chemicals of such kinds are repeatedly used in circulation and without involving unnecessary waste.

The waste water treating apparatus in the present embodiment may be constructed by remodelling the second reaction tank 16 in the FIG. 9 prior-art waste water treating apparatus into a first inorganic and biological sludge immobilizing tank 107 as shown in FIG. 5; by remodelling the third reaction tank 19 in FIG. 9 into a second inorganic and biological sludge immobilizing tank 122 as shown in FIG. 5; by adding a BSK bacteria culture tank 127 and a warming device 126, and by eliminating the contact oxidization tank 28 shown in FIG. 9.

In other words, the waste water treating apparatus in the present embodiment can be constructed by remodelling some parts of the existing waste water treating apparatus and adding small units including the BSK bacteria culture tank 127 and inorganic and biological sludge mixing tank 128. The apparatus thus constructed has novel units or bioreactors including inorganic and biological sludge immobilizing tanks 107, 122. The bioreactors each can provide high-quality treatment with respect to both fluorine and organic matter, such as surfactants, within one single tank.

Therefore, the waste water treating apparatus in the present embodiment eliminates the need for such a large-size unit as the contact oxidization tank 28 in FIG. 9 which has hitherto been used.

Further, the waste water treating apparatus in the present embodiment may be constructed by adding a biological treatment function to the prior art arrangement shown in FIG. 8 which is not equipped with a contact oxidization tank. This affords some reasonable saving in the cost of construction as compared with the case where the apparatus is newly constructed.

In summary, according to the fifth embodiment, the inorganic and biological sludge immobilizing tanks 107, 122, which may be constructed by remodelling a part of any existing waste water treating system at a semiconductor factory or other factories, can be advantageously utilized so that waste water containing fluorine and surfactants is efficiently treated through the process of reaction. As a result, waste is reduced as much as possible and the fluorine concentration of the waste water is decreased to a target level before the waste water is discharged.

Treated water resulting from the treatment of waste water containing fluorine and surfactants in accordance with the above exemplified method of treatment has substantially less chemical content and has already passed through the process of microbial treatment. Therefore, the treated water involves less effect upon the environment and is even available for keeping a small fish, such as cyprinodont, therein. Today, when the preservation of global environment is urgently called for, the above exemplified system is contributive to materials- and energy-saving and may be said to be an environment-friendly apparatus.

Next, for purposes of comparison of the above exemplified method and the prior art, results of experiments conducted by experimental units are shown below. With respect to the experimental unit which corresponds to the arrangement of FIG. 5, the capacity of the inorganic and biological sludge immobilizing tank was designed to be about 20 liters. For the experimental unit corresponding to the conventional arrangement including a biological treatment function as shown in FIG. 9, the capacity of the second reaction tank 16 was set at about 20 liters, and that of the contact oxidization tank 28 was set at about 100 liters. For the FIG. 8 prior art arrangement, the capacity of the second reaction tank 16 was set at about 20 liters.

1) Quality of raw waste water containing fluorine and surfactants

| pH | 2.2 |
|---|---|
| F. concentration | 152 ppm |
| COD | 21 ppm (various surfactants involved, taken as COD) |

2) Quality of treated water as treated by the experimental unit corresponding to the FIG. 9 prior art arrangement (Phosphoric acid and urea were added as nutrients for the contact oxidization tank.)

| pH | 7.3 |
|---|---|
| F. concentration | 6.2 ppm |
| COD | 5.5 ppm |

3) Quality of treated water as treated by the experimental unit corresponding to the FIG. 8 prior art arrangement

| pH | 7.6 |
|---|---|
| F. concentration | 6.5 ppm |
| COD | 18.7 ppm |

4) Quality of treated water as treated by the experimental unit corresponding to the fifth embodiment of the invention

| pH | 7.5 |
|---|---|
| F. concentration | 5.1 ppm |
| COD | 5.2 ppm |

5) Quantity of sludge generated

In the experiments, measurements of sludge generation witnessed that sludge generation from the experimental unit corresponding to the fifth embodiment was not more than 60% of the sludge generation from the experimental unit corresponding to FIG. 8 prior art apparatus.

(Sixth Embodiment)

Figure 6:
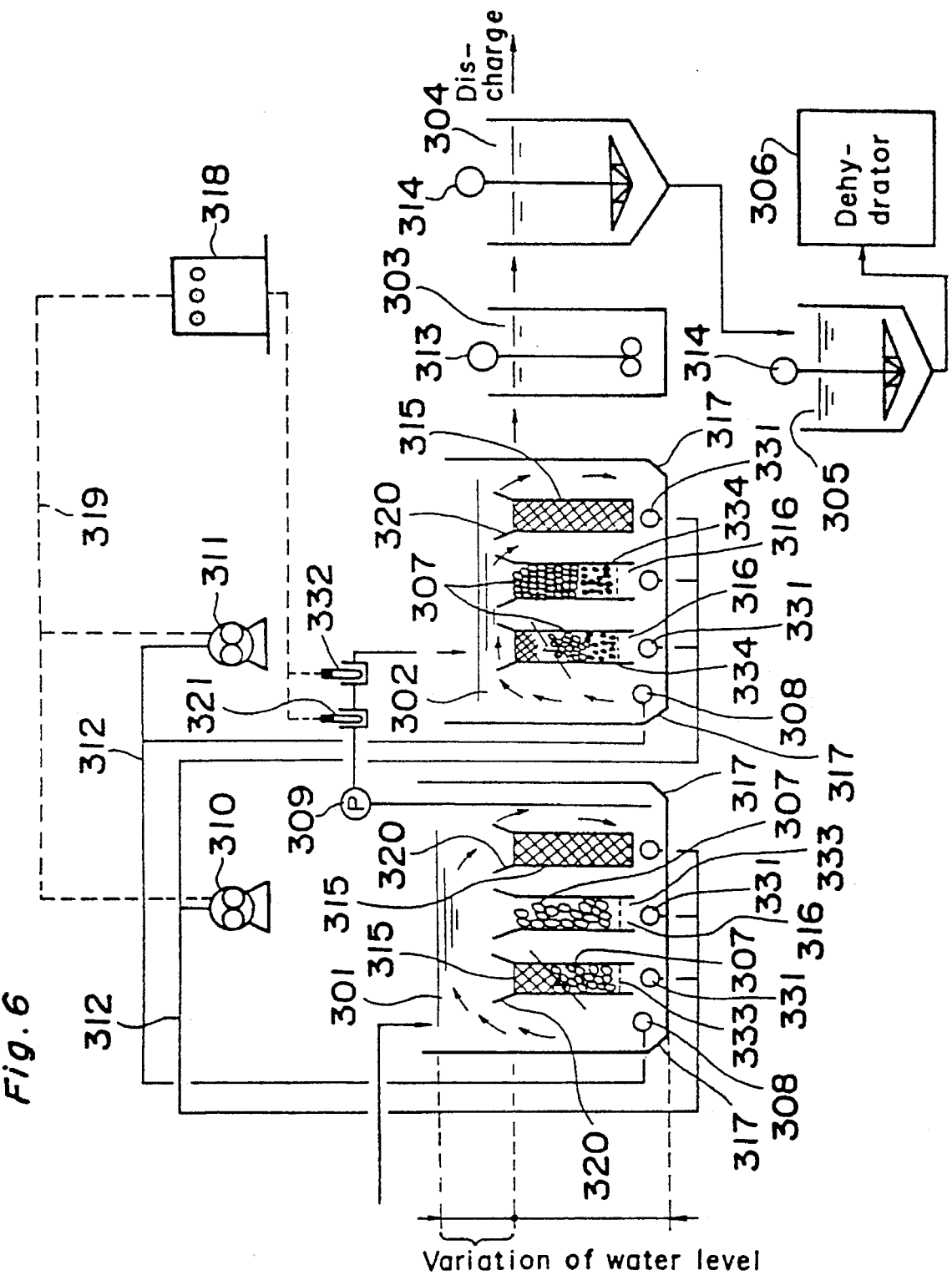
FIG. 6 is a schematic diagram of an apparatus for waste water treatment of waste water containing fluorine according to a sixth embodiment of the present invention.

FIG. 6 schematically shows an apparatus for treating waste water containing fluorine and hydrogen peroxide (hereinafter referred to as waste water) in accordance with a sixth embodiment of the invention.

In FIG. 6, numeral 301 designates a first reaction adjustment tank. A calcium carbonate mineral 307 is packed in the first reaction adjustment tank 301. Further, the first reaction adjustment tank 301 is equipped with an agitating device including two kinds of air diffuser pipes, namely, an air diffuser pipe 308 and a calcium-carbonate mineral agitating air diffuser pipe 331.

The calcium carbonate mineral 307 is packed in network pipes 315 disposed within the first reaction adjustment tank 301. The network pipe 315 includes a introduction 320 which forms a top portion thereof, a porous plate 333 which forms a bottom portion, and a network pipe air reservoir 316. The porous plate 333 serves to prevent the calcium carbonate mineral 307 from falling from the network pipe 315.

The air diffuser pipe 308 has a function of performing stream agitation of the waste water in the first reaction adjustment tank 301, as well as maintaining dissolved oxygen in the tank 301. The other air diffuser pipe or calcium carbonate mineral agitating air diffuser pipe 331 has a function of agitating by air the calcium carbonate mineral within the network pipe 315, thereby to positively facilitate the reaction of fluorine with calcium. In other words, the calcium carbonate mineral agitating air diffuser pipe 331 operates to separate from the surface of the calcium carbonate mineral 307 a crystalline reaction product of calcium fluoride produced on that surface.

The network pipe air reservoir 316 has a function of preventing air discharged from the calcium carbonate mineral agitating air diffuser pipe 331 from exiting outward of the network pipe 315 thereby to allow the air to efficiently flow upward within the network pipe 315.

The agitating device having the two different kinds of air diffuser pipes 308, 331 in FIG. 6 is an aerated agitation device. The agitating device further includes a first blower 310, a second blower 311, a control panel 318, a pH meter 321, a fluorine meter 332, and a pipe 312 connecting the blowers 310, 311 with the air diffuser pipes 308, 331. It may be arranged that the agitating device include a mechanical agitator 13 as shown in FIG. 9 and/or an underwater agitator for use underwater. For purposes of maintaining dissolved oxygen in the tank to facilitate bacterial propagation, however, aerated agitation by air diffuser pipes is preferred to mechanical agitation by such a mechanical agitator 13 join When the fluorine concentration in fluorine-containing waste water flowing into the first reaction adjustment tank 301 is 50 ppm or less, the pH of the waste water is often within a pH range of 3 to 5. In such a case, the air supply for aeration which is fed through the air diffuser pipes 308, 331 may be about 20 $m^3$ per day for each $m^3$ of the capacity of the tank 301. When the fluorine concentration in fluorine-containing waste water flowing into the first reaction adjustment tank 301 is 200 ppm or more, the pH of the waste water is rather low and often 2.5 or lower. In such a case, it is necessary that the air supply for aeration from the air diffuser pipes 308 and 331 be 60 $m^3$ or more per day for each $m^3$ of the capacity of the tank 301.

In this embodiment, it is arranged that a signal from the pH meter 321 and a signal from the fluorine meter 332 are transmitted to an adjuster incorporated in the control panel 318. The adjuster controls the run speeds of the first blower 310 and of the second blower 311 to optimize the air supply from the air diffuser pipes 331, 308 to the tanks 301, 302, thus enabling the interior of the tanks 301, 302 to be agitated under an optimum supply of air.

Therefore, when the fluorine concentration is either not more than 50 ppm or not less than 200 ppm, the air supply for agitation is controlled through both pH management by the pH meter 321 and fluorine concentration control by the fluorine meter 332, so that the process of reaction can be effectively performed. In other words, the control panel 318 controls the run speeds of the first blower 310 and of the second blower 311 on the basis of the pH value measured by the pH meter 321 and of the fluorine concentration value measured by the fluorine meter 332. Thus, when the fluorine concentration of the waste water is high and the pH is low, the blowers are operated at a high speed, and when the fluorine concentration is low and the pH is high, the blowers are operated at a low speed.

In the present embodiment, the pH meter 321 and the fluorine meter 332 are mounted at the waste water outlet port of the first reaction adjustment tank 301. The reason is that where they are located at the waste water inlet port of the first reaction adjustment tank 301, air supply cannot be optimally controlled, because fluctuations in the fluorine concentration and acid concentration or pH of waste water entering through the inlet port are greater than those at the outlet side. Where those meters are mounted at the waste water outlet port of the second reaction adjustment tank 302, some delay may be caused in air supply control. This is another reason for the meters 321,332 being disposed at the outlet port of the first reaction adjustment tank 301.

The water level of the first reaction adjustment tank 301 is so controlled that the calcium carbonate mineral 307 is constantly submerged in waste water within the tank, for which purpose the pump 309 is controlled by a level meter (not shown). Further, as FIG. 6 shows, water volume within the adjustment tank 301 is adjusted so that the water level of the adjustment tank 301 is always positioned above the loading cover 320 of the network pipe 315. Therefore, the calcium carbonate mineral 307 under the loading cover 320 is always submerged; hence, reaction of the fluorine in waste water with calcium can be accelerated.

In the second reaction adjustment tank 302, each network pipe 315 placed therein has calcium carbonate mineral 307 and activated carbon 334 packed therein. Further, the tank 302 is loaded with an aluminum agent (not shown). The second reaction adjustment tank 302 is also equipped with the air diffuser pipes 308 and 331.

The calcium carbonate mineral 307 used in the present embodiment is a material obtained by crushing natural lime stone and is also commercially available as ground calcium carbonate and "Kansuiseki" Trade name). Whereas an aqueous solution of slaked lime is strong alkali, an aqueous solution of naturally existing calcium carbonate mineral is neutral and even available for keeping small fishes, such as cyprinodont and *Anchilognathus intermedius*. The calcium carbonate mineral is a chemically safe material and has a rough and irregular surface suitable for microbial propagation. Thus, the presence of calcium carbonate mineral 307 facilitates treatment of organic matter in waste water.

The particle size of the calcium carbonate mineral 307 packed in the network pipe 315 disposed in the first reaction adjustment tank 301 is set larger than the particle size of the calcium carbonate mineral 307 packed in the second reaction adjustment tank 302. The reason for this is that the pH of waste water in the first reaction adjustment tank 301 is 3 or lower on the acid side and, therefore, for reaction with such waste water, coarser particles of calcium carbonate mineral are more suitable. More particularly, particles of the calcium carbonate mineral 307 in the first reaction adjustment tank 301 are sized on the order of 1 to 1.5 cm in diameter, and particles of the calcium carbonate mineral 307 in the second reaction and adjustment tank 302 are sized on the order of 0.5 to 1 cm in diameter, although these sizes are not an essential condition. Particles of the calcium carbonate mineral 307 with a particle diameter on the order of 1 cm will be readily brought into dancing movement through air agitation and aeration by the air diffuser pipes 308, 331. This provides for effective agitation and effective reaction of fluorine with calcium.

The activated carbon 334 packed in the lower part of the network pipe 315 in the second reaction adjustment tank 302 is not particularly limited as to the kind or type thereof. It may be a coconut shell-based or coal-based carbon. For calcium carbonate mineral of suitable size, various commercially available materials of the kind may be suitably selected within a particle size range of 5 to 10 mm. It is only important in this connection that particles of activated carbon be not likely to fall off the network pipe 315. When waste water is caused to pass through the activated carbon 334, the pH of the waste water tends to change upward. The activated carbon 334 is active on the alkali side, and this is advantageous for the purpose of treating fluorine-containing waste water having a low pH value in particular. Activated carbon is porous and its pores are convenient for microbial growth and propagation. Therefore, activated carbon is suited for use as an immobilizing carrier for microorganisms.

The aluminum agent added as a coagulant to the second reaction adjustment tank 302 operates to eliminate fluorine in waste water. It has been empirically found that when the fluorine concentration of waste water in the tank 302 is of the order of 15 to 20 ppm or less, the waste water being sufficiently aerated, and when the waste water is closer to the neutral level, fluorine in the waste water can be more effectively eliminated by the aluminum agent. In the present example, therefore, the fluorine in the waste water is reacts with the calcium carbonate mineral 307 in the first reaction adjustment tank 301 so that the fluorine concentration in the waste water is decreased to about 15 to 20 ppm at the outlet port of the tank 301. Further, the pH of the waste water is brought closer to the neutral level under aeration. Then, for the purpose of the next step of fluorine removal, an aluminum agent as a coagulant is added in the second reaction adjustment tank 302 to further reduce the fluorine concentration of the waste water to about 3 ppm.

In the present embodiment, it is arranged that an inorganic coagulant, such as an aluminum agent, and a polymer coagulant may be added to the coagulation tank 303. The settling tank 304 of this embodiment is operable for solid-liquid separation of waste water. In FIG. 6, numeral 305 designates a sludge concentration tank, numeral 306 designates a dehydrator such as a filter press, numeral 313 designates an agitator, and numeral 314 designates a collector.

In the waste water treating apparatus of the embodiment, the first reaction adjustment tank 301, which corresponds to the raw waste water tank 4 of the prior art, is packed with calcium carbonate mineral 307. The adjustment tanks 301 and 302 are respectively equipped with air diffuser pipes 308 and 331, as agitation means and aeration means, or with mechanical agitation means, such as underwater agitator. Therefore, according to this arrangement, in the first reaction adjustment tank 301, the waste water is neutralized and fluorine contained in the waste water is caused to react with the calcium carbonate mineral 307, whereby the fluorine concentration of the waste water is reduced. Therefore, according to the foregoing embodiment, the whole arrangement can be simplified and thus the number of chemical handling operations which has involved a serious problem in the past can be reasonably decreased. That is, according to the embodiment, the size of mechanically controlled parts or units in the waste water treating apparatus can be made considerably smaller than that in the prior art. Thus, the cost of equipment maintenance is also reduced. In addition, in spite of reduction in size, the apparatus has a unique organic matter treating function which has not been found with any conventional waste water treating facilities.

As already stated, for agitation means in the foregoing embodiment, an aeration device may be more advantageously employed than a mechanical agitator device, in enabling maximum treatment of organic matter present in waste water by means of aerobic microorganisms.

Treatment of waste water containing fluorine and hydrogen peroxide is carried out in the following manner using the apparatus of FIG. 6.

Waste water containing fluorine and hydrogen peroxide in which the fluorine concentration fluctuates from time to time within a concentration range of 30 to 300 ppm and in which the hydrogen peroxide concentration fluctuates from time to time within a range of 10 to 50 ppm is first entered into the first reaction adjustment tank 301.

In this conjunction, discharge quantity of the pump 309 and controlled water level is adjusted so that the calcium carbonate mineral 307 placed in the first reaction adjustment tank 301 lies always underwater. Within the first reaction adjustment tank 301, treatment by the calcium carbonate mineral 307 is carried out for removal of the fluorine in the waste water and neutralization of the waste water. This treatment may be carried out at a waste water temperature of 20° C. or more, most preferably about 30° to 40° C.

Time for reaction in the first reaction adjustment tank 301 is sufficiently allowed so that the fluorine concentration of the waste water is 15 to 20 ppm at the waste water outlet of the tank 301, and aeration is vigorously effected within the tank 301 so as to allow the reaction to occur under agitation. Where the capacity of the first reaction adjustment tank 301 is 240 liters and the fluorine concentration of incoming waste water is 120 ppm, the retention time for the waste water in the tank 301 may be not more than three hours, within which the fluorine concentration of the waste water can be reduced to 15 to 20 ppm. The time for reaction in the first reaction adjustment tank 301 is determined by the fluorine and acid concentrations of the waste water and the quantity of air used in the aeration. Judging from experiments, a retention time of three hours or more in the tank 301 may be reasonably sufficient.

During aeration by the air diffuser pipes 308, 331, microorganisms present in the air are mixed into the waste water in the tank 301, 302. For such microbial inclusion, the second reaction adjustment tank 302 is better conditioned than the first reaction adjustment tank 301, but yet microorganisms are allowed to propagate on the surface of calcium carbonate mineral 307 in the respective reaction adjustment tank as well as on the surface of activated carbon 334 in the second reaction adjustment tank 302. Microorganisms have a buffer action by which the waste water is brought closer to the neutral level.

Waste water, immediately after entry into the first reaction adjustment tank 301, is at a pH level of 3 or lower on the acid side. Therefore, the waste water dissolves the calcium carbonate mineral 307 in the tank 301 to ionize calcium with which fluorine in the waste water reacts to produce fine flocs of calcium fluoride and crystalline reaction product. As a consequence of the reaction, carbon dioxide gas and water are produced.

Conventionally, an excessive quantity of slaked lime ($Ca(OH)_2$) is added to waste water for purposes of treating fluorine in the waste water, with the result that hydroxides attributable to the use of slaked lime in large quantities is produced in large quantities. In contrast, according to the present embodiment, there occurs no hydroxide generation, and sludge generation is substantially reduced as compared with the prior art.

In the first reaction adjustment tank 301, the fluorine concentration in waste water is reduced to 15 to 20 ppm and brought closer to the neutral level, with the hydrogen peroxide concentration being at a level of 10 to 50 ppm. Then, the waste water is transferred to the second reaction adjustment tank 302 via the pipe 312 and pump 309. In the second reaction adjustment tank 302, an aluminum agent, such as polyaluminum chloride, aluminum sulfate or the like, is added to the waste water. The aluminum agent reacts with the fluorine in the waste water to produce aluminum fluoride. Any excess aluminum is quickly changed into flocs of aluminum hydroxide which adsorb aluminum fluoride. Through this process, the fluorine concentration of the waste water can be further reduced to 3 ppm or less.

It is known that such flocs of aluminum hydroxide are more likely to develop at a level close to neutrality than on the acid side. Hitherto, in order to neutralize waste water, it has been general practice to add an alkali chemical, such as caustic soda, to the waste water, since addition of an aluminum agent being an acid chemical to waste water results in a downward change in the pH of the waste water. In contrast, according to the present embodiment, by virtue of the calcium carbonate mineral 307 disposed in the first reaction adjustment tank 301 and the calcium carbonate mineral 307 and activated carbon 334 disposed in the second reaction adjustment tank 302, the waste water is neutralized. Further, through advantageous utilization of airborne microorganisms which propagate on the surfaces of the calcium carbonate mineral 307 and activated carbon 334, waste water neutralization is automatically and safely carried out. Therefore, according to the embodiment, the need for a pH adjustment tank, which tank has been required in the past, is eliminated. According to the embodiment, when the fluorine concentration of the waste water goes high, aeration by the air diffuser pipes 308, 331 is effected more vigorously that at normal times thereby to separate microorganisms immobilized to the surface of calcium carbonate mineral 307 from that surface, so that the flocculating behavior of such microbial flocs is advantageously utilized for fluorine treatment. This results in reduced use of aluminum agents.

Then, the waste water is transferred from the second reaction adjustment tank 302 to the coagulation tank 303, in which fine flocs and microbial flocs developed in the first and second reaction adjustment tanks 301, 302 are grown by a polymer coagulant into larger and steadier flocs. For purposes of agitation in the coagulation tank 303, mechanical agitation by the agitator 313 at a slow rate of the order of 30 rpm is preferred in order not to break the flocs. According to this embodiment, the usage of polymer coagulant could be reduced 30% from the prior art level.

Then, the waste water is transferred from the coagulation tank 303 to the settling tank 304, in which the waste water is subjected to solid-liquid separation by using a collector 314. The supernatant of the waste water is discharged from the settling tank 304. Sludge precipitated in the settling tank 304 is set to the sludge concentration tank 305, in which the sludge is collected by means of the collector 314 and then thickened or concentrated by sedimentation.

Sludge which has been concentrated through the above process is transferred from the sludge concentration tank 305 to a dehydrator 306 comprising a filter press or the like, wherein the sludge is dehydrated to form a dehydrated cake as an industrial waste.

Next, for purposes of comparison of the above exemplified method and the prior art, results of experiments conducted by experimental units are shown below.

With respect to the experimental unit corresponding to the present embodiment, the capacity of the first reaction adjustment tank 301 was set at 240 liters, and that of the second reaction adjustment tank 302 was set at 200 liters. Experiments were made according to the flow of the process shown in FIG. 6. For the prior art arrangement, an experimental unit corresponding to the FIG. 8 arrangement having a waste water tank of a 240 liter capacity was employed.

1) Quality of raw waste water containing fluorine

| pH | 2.3 |
|---|---|
| F. concentration | 152 ppm |
| COD | 18 ppm |
| $H_2O_2$ concentration | 32 ppm |

2) Quality of treated water as treated by the experimental unit corresponding to the FIG. 6 embodiment

| pH | 7.2 |
|---|---|
| F. concentration | 1.2 ppm |
| COD | 4.2 ppm |
| $H_2O_2$ concentration | 1 ppm or less |

3) Quality of treated water as treated by the experimental unit corresponding to the FIG. 8 prior art arrangement

| pH | 7.7 |
|---|---|
| F. concentration | 6.2 ppm |
| COD | 16 ppm |
| $H_2O_2$ concentration | 28 ppm |

4) Quantity of sludge generated

In the experiments, measurements of sludge generation witnessed that sludge generation from the experimental unit corresponding to the invention apparatus of FIG. 6 was about 20% or less of the sludge generation from the experimental unit corresponding to the FIG. 8 prior art apparatus.

Figure 7:
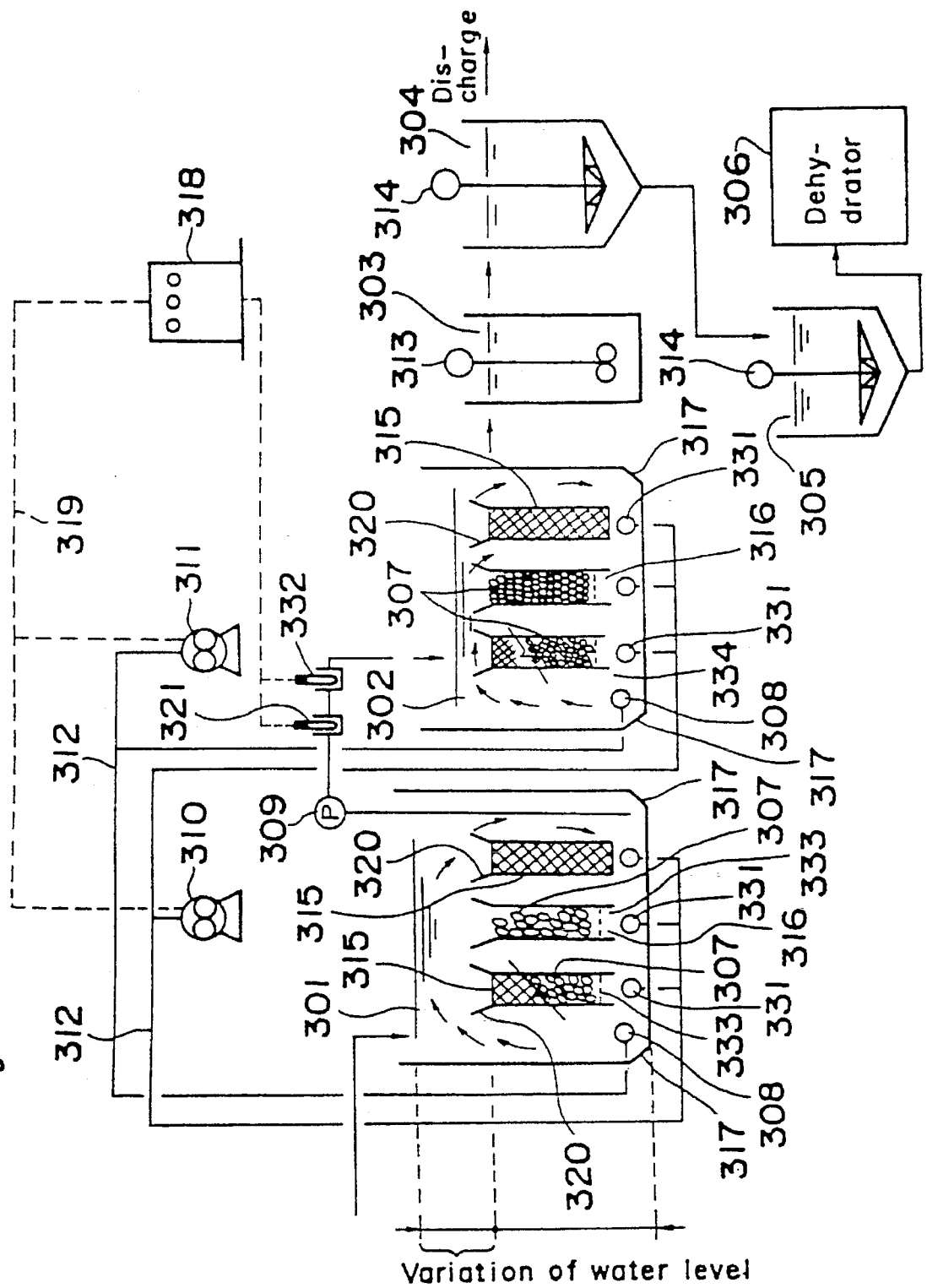
FIG. 7 is a schematic diagram of a variant of the apparatus for waste water treatment shown in FIG. 6.

In the sixth embodiment, both calcium carbonate mineral 307 and activated carbon 334 are placed in the second reaction adjustment tank 302. However, only calcium carbonate mineral 307 may be placed in the tank 302 as shown in FIG. 7.

As obvious from the above description, the invention provides for reduction of apparatus size. No excessive chemicals are used. The invention involves no generation of hydroxide, a substance which has been a large source of sludge. Thus, sludge generation is considerably reduced, and this provides for size reduction with respect to such units as coagulation tank, settling tank, and agitator. Therefore, the invention permits simplification of apparatus as a whole, affords ease of operation management, and provides cost reduction in both initial and running costs.

Fluorine removal and waste water neutralization can be effectively achieved and, at the same time, organic matter, such as surfactants and alcohol, in waste water can be biologically treated. Thus, according to the invention, a novel waste water treating system is provided which is contributive toward resource preservation, energy saving, and is environment-friendly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for waste water treatment, comprising the steps of:

(a) introducing fluorine-containing waste water into a first tank packed with a calcium carbonate mineral;

(b) agitating said fluorine-containing waste water in the first tank through aeration by diffused air to cause fluorine in the waste water to react with the calcium carbonate mineral to form flocs of calcium fluoride, said calcium carbonate mineral being also aerated by the diffused air;

(c) introducing the waste water from the first tank to a second tank packed with a calcium carbonate mineral;

(d) agitating the waste water in the second tank through aeration by diffused air to cause fluorine in the waste water to react with the calcium carbonate mineral to form flocs of calcium fluoride, said calcium carbonate mineral being also aerated by the diffused air, said aeration being sufficient to cause airborne microorganisms to accumulate said fluorine in said waste water in vivo; and (e) separating the flocs from the waste water.

2. The method of claim 1, further comprising the steps of:

(f) adding an effective amount of an aluminum agent to the waste water in the second tank to cause fluorine in the waste water under agitation to react with the aluminum agent to form aluminum fluoride and flocs of aluminum hydroxide;

(g) separating by sedimentation a sludge containing flocs produced by steps (b), (d) and (f) from the waste water;

(h) concentrating the sludge separated in step (g); and (i) dehydrating the sludge concentrated in step (h).

3. The method of claim 2, further comprising the steps of:

(j) introducing waste water from the second tank to a third tank having sludge carrying means;

(k) transferring at least part of the sludge separated in step (g) to the third tank so that the sludge is attached to the sludge carrying means and immobilized, the waste water introduced in step (j) coming into contact with said sludge attached to the sludge carrying means; and (l) repeating steps (g) and (k) until a predetermined sludge concentration is reached in the third tank.

4. The method of claim 3, wherein bacteria of *Bacillus subtilis* Kubota are mixed with the sludge transferred to the third tank in step (k).

5. The method of claim 1, wherein said diffused air in the first tank contains ozone and the diffused air in the second tank does not contain ozone.

6. The method of claim 1, wherein in step (d) said aeration causes aerobic microorganisms present on a surface of the calcium carbonate mineral to be detached from the calcium carbonate mineral to flocculate reaction products in the second tank.

7. The method of claim 1, wherein the second tank also contains activated carbon and wherein in step (d) said aeration causes aerobic microorganisms present on a surface of the calcium carbonate mineral and activated carbon to be detached from the calcium carbonate mineral and activated carbon to flocculate reaction products in the second tank.

8. A method for waste water treatment, comprising the steps of:

(a) introducing fluorine-containing waste water into a first tank packed with a calcium carbonate mineral;

(b) agitating said fluorine-containing waste water in said first tank to cause fluorine in the waste water to react with the calcium carbonate mineral to form flocs of calcium fluoride;

(c) introducing the waste water from said first tank into a second tank packed with the calcium carbonate mineral;

(d) adding an effective amount of an aluminum agent to the waste water in the second tank;

(e) agitating the waste water in the second tank by aeration to cause fluorine in the waste water to react with the aluminum agent and calcium carbonate mineral to form aluminum fluoride and flocs of aluminum hydroxide, said aeration being carried out such as to cause aerobic microorganisms present on the surface of the calcium carbonate mineral to be detached from the calcium carbonate mineral to flocculate reaction products in the second tank; and (f) separating the flocs and flocculated reaction products from the waste water.

9. A method for waste water treatment, comprising the steps of:

(a) introducing fluorine-containing waste water into a reaction tank to cause fluorine contained in the waste water to react with calcium present in the tank to form calcium fluoride;

(b) introducing the waste water from said reaction tank to a sludge immobilizing tank to bring the waste water into contact with sludge carrying means provided in the sludge immobilizing tank, sludge in the waste water being attached to the sludge carrying means and immobilized;

(c) supplying sludge containing bacteria of *Bacillus subtilis* Kubota to the sludge immobilizing tank while aerating the waste water in the sludge immobilizing tank; and (d) introducing the waste water from said sludge carrying immobilizing tank to a settling tank to separate sludge from the waste water.

10. The method of claim 9, further comprising the step of returning at least part of the sludge separated from the waste water in step (d) to the reaction tank.

11. The method of claim 9, further comprising the step of returning at least part of the sludge separated from the waste water in step (d) to the sludge immobilizing tank.

12. The method of claim 9, further comprising the step of mixing at least part of the sludge separated in step (d) with bacteria of *Bacillus subtilis* Kubota such that the sludge containing the bacteria of *Bacillus subtilis* Kubota is returned to the sludge immobilizing tank.

13. The method of claim 9, further comprising the steps of:

(e) introducing the waste water from said settling tank to a second sludge immobilizing tank to bring the waste water into contact with sludge carrying means provided in the second sludge immobilizing tank, sludge in the waste water being attached to the sludge carrying means and immobilized;

(f) supplying sludge containing bacteria of *Bacillus subtilis* Kubota to the second sludge immobilizing tank while aerating the waste water in the second sludge immobilizing tank; and (g) introducing the waste water from said second sludge carrying tank to a second settling tank to separate sludge from the waste water into supernatant.

14. The method of claim 13, further comprising the step of returning at least part of the sludge separated from the waste water in step (g) to the second sludge immobilizing tank.

15. The method of claim 14, further comprising the step of mixing at least part of the sludge separated in step (g) with bacteria of *Bacillus subtilis* Kubota such that the sludge containing the bacteria of *Bacillus subtilis* Kubota is returned to the first and second sludge immobilizing tanks.

* * * * *